United States Patent
de Abreu Resenes et al.

(10) Patent No.: US 11,582,345 B2
(45) Date of Patent: Feb. 14, 2023

(54) CONTEXT DATA MANAGEMENT INTERFACE FOR CONTACT CENTER

(71) Applicant: Dell Products L.P., Round Rock, TX (US)

(72) Inventors: Jonas de Abreu Resenes, Porto Alegre (BR); Joseph P. Kelly, Land O Lakes, FL (US); Jean Felipe Martins da Costa, Porto Alegre (BR); Gabriel Timm, Porto Alegre (BR)

(73) Assignee: Dell Products L.P., Round Rock, TX (US)

( * ) Notice: Subject to any disclaimer, the term of this patent is extended or adjusted under 35 U.S.C. 154(b) by 276 days.

(21) Appl. No.: 16/577,163

(22) Filed: Sep. 20, 2019

(65) Prior Publication Data

US 2020/0099788 A1 Mar. 26, 2020

Related U.S. Application Data

(60) Provisional application No. 62/734,614, filed on Sep. 21, 2018.

(51) Int. Cl.
*H04M 3/00* (2006.01)
*H04M 3/51* (2006.01)

(52) U.S. Cl.
CPC .... *H04M 3/5183* (2013.01); *H04M 2203/558* (2013.01)

(58) Field of Classification Search
CPC .......................... H04M 3/5183; H04M 3/5191
See application file for complete search history.

(56) References Cited

U.S. PATENT DOCUMENTS 5,412,522 A * 5/1995 Lockhart .............. G11B 21/083
360/99.08
7,457,404 B1 * 11/2008 Hession .............. H04M 3/5175
379/265.07

(Continued)

OTHER PUBLICATIONS

Avaya, "Avaya Context Store Snap-In Reference," Avaya Inc., Release 3.4, Dec. 2017, 130 pages.

(Continued)

*Primary Examiner* — Rasha S Al Aubaidi
(74) *Attorney, Agent, or Firm* — Ryan, Mason & Lewis, LLP

(57) ABSTRACT

Context data management in a contact center environment is provided. For example, a method comprises receiving a given contact instance for a given user of a contact center, wherein the contact center comprises a plurality of communication channels configured to enable the user to initiate a contact instance and wherein the given contact instance is received over one of the plurality of communication channels. The method further comprises one of generating and updating a context data management pattern in response to receiving the given contact instance, wherein the context data management pattern comprises a data structure of one or more records that maintain information relating to the given contact instance received over the one of the plurality of communication channels and information relating to one or more previous contact instances associated with the user received over one or more of the plurality of communication channels.

20 Claims, 29 Drawing Sheets

(56) References Cited

U.S. PATENT DOCUMENTS

| | | | | |
|---|---|---|---|---|
| 10,333,997 | B2* | 6/2019 | Hariri | H04L 65/1069 |
| 10,430,439 | B1* | 10/2019 | Wilson | G06F 16/283 |
| 2010/0306389 | A1* | 12/2010 | Mu | H04L 67/02 |
| | | | | 709/228 |
| 2016/0140194 | A1* | 5/2016 | Chang | G06F 16/214 |
| | | | | 709/203 |
| 2020/0096599 | A1* | 3/2020 | Hewett | G06Q 20/203 |

OTHER PUBLICATIONS

Wikipedia, "Call Centre," https://en.wikipedia.org/w/index.php?title=Call_centre&oldid=915792349, Sep. 15, 2019, 8 pages.
searchcustomerexperience.techtarget.com, "Contact Center," www.searchcustomerexperience.tehtarget.com/definition/contact-center, Nov. 2017, 4 pages.

* cited by examiner

*FIG. 3A*

| 310-1 | CONTACT METHOD |
|---|---|
| | • 1 (PK) |
| | • 02132321 (ANI) |

| 310-2 | CONTACT METHOD |
|---|---|
| | • 2 (PK) |
| | • bob@dell.com |

*FIG. 3B*

| 320-1 | INTERACTION |
|---|---|
| | • 1 (PK) |
| | • 1 (FK) |
| | • ORDER |
| | • 123456 |
| | • ("key":value) |

| 320-2 | INTERACTION |
|---|---|
| | • 2 (PK) |
| | • 2 (FK) |
| | • SERVICE |
| | • A31SSD09X |
| | • ("key":value) |

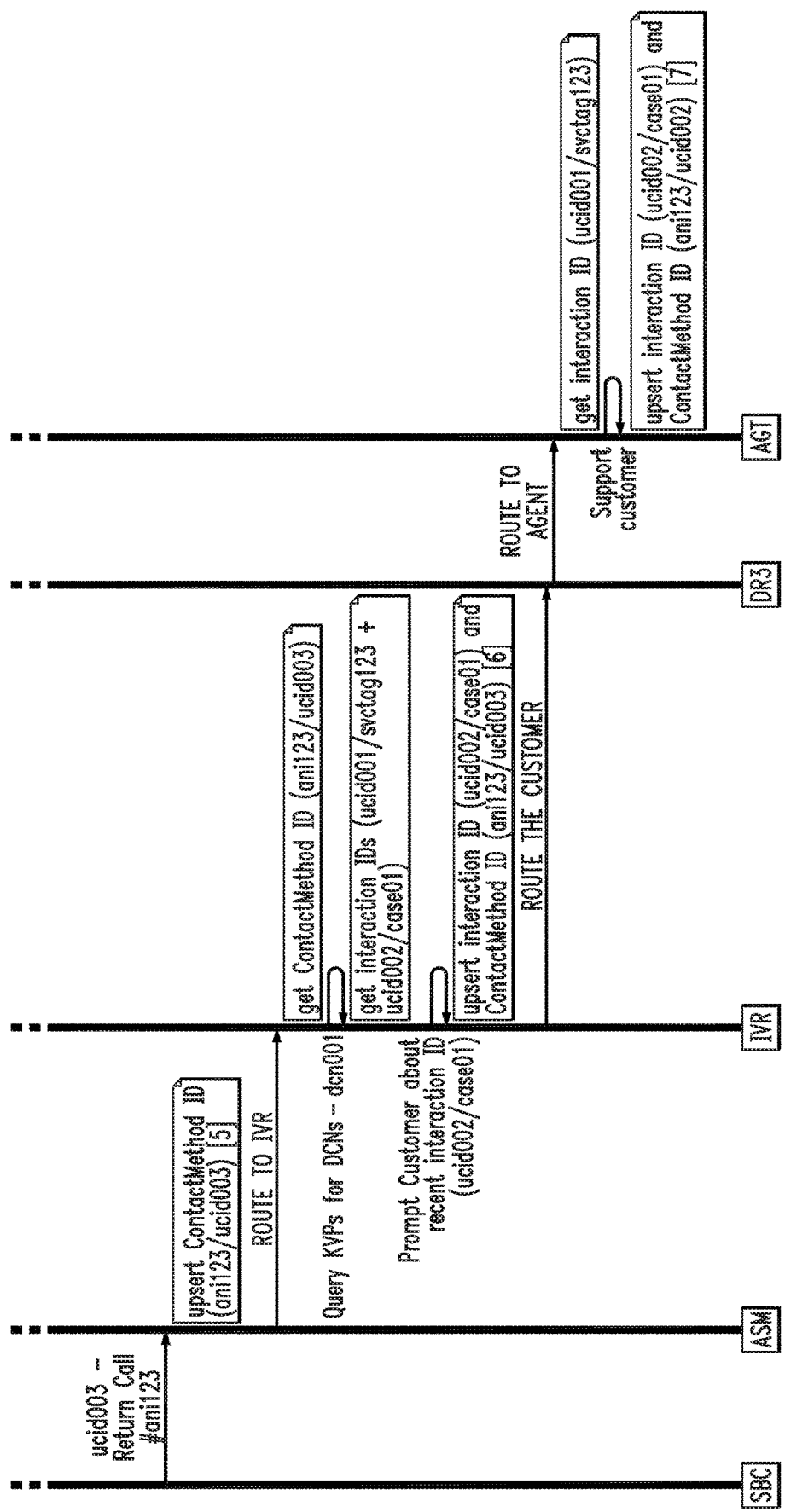

700

800

900

1000

1100

1200

1300

FIG. 14
1400
| 1st DIGIT | | 2nd DIGIT | | 3rd DIGIT | | 4th DIGIT AND 5th DIGIT | |
|---|---|---|---|---|---|---|---|
| MEDIA | | REGION | | PLATFORM | | INTERACTION TYPE | |
| AGENT DESKTOP | 9 | AMER | 1 | ACD | 1 | SERVICE TAG | 01 |
| | | EMEA | 2 | CHAT | 2 | CASE_NUMBER | 02 |
| | | APJ | 3 | EMAIL | 3 | SERIAL_NUMBER | 03 |
| | | LATAM | 4 | SMS | 4 | ORDER_NUMBER | 04 |
| | | INDIA | 5 | SOCIAL | 5 | DPID | 05 |
| | | FUTURE | 6 | WEB | 6 | DFS1 | 06 |
| | | FUTURE | 7 | FUTURE | 7 | DFS2 | 07 |
| | | FUTURE | 8 | FUTURE | 8 | DFS3 | 08 |
| | | FUTURE | 9 | FUTURE | 9 | | 09 |
| | | NOT USED | 0 | FUTURE | 0 | | 10 |
| | | | | | | | 11 |
FIG. 15
1500
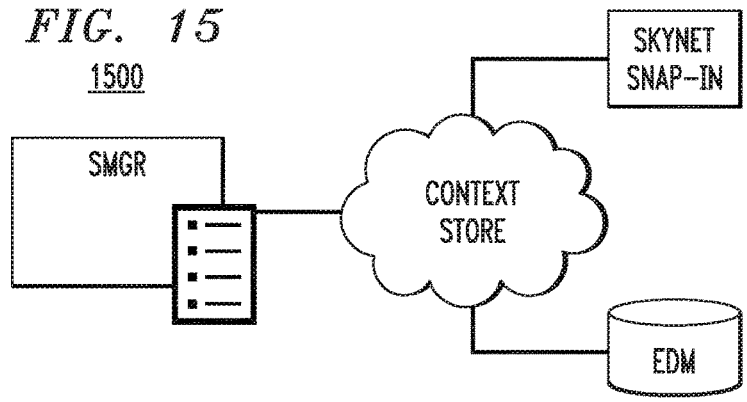
FIG. 16
1600
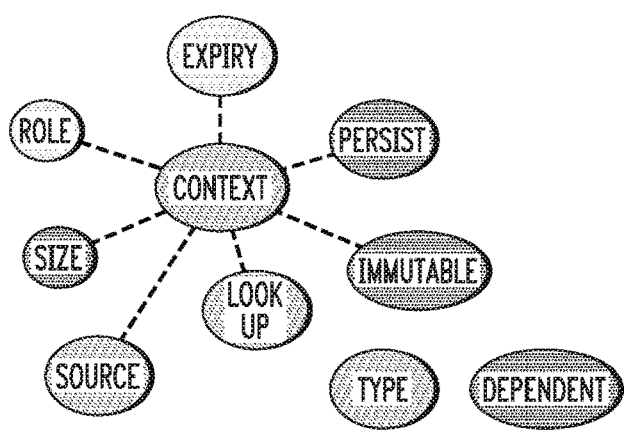

1700

1800

1900

2000

2100

2200

2300

2400

2500

2600

2700

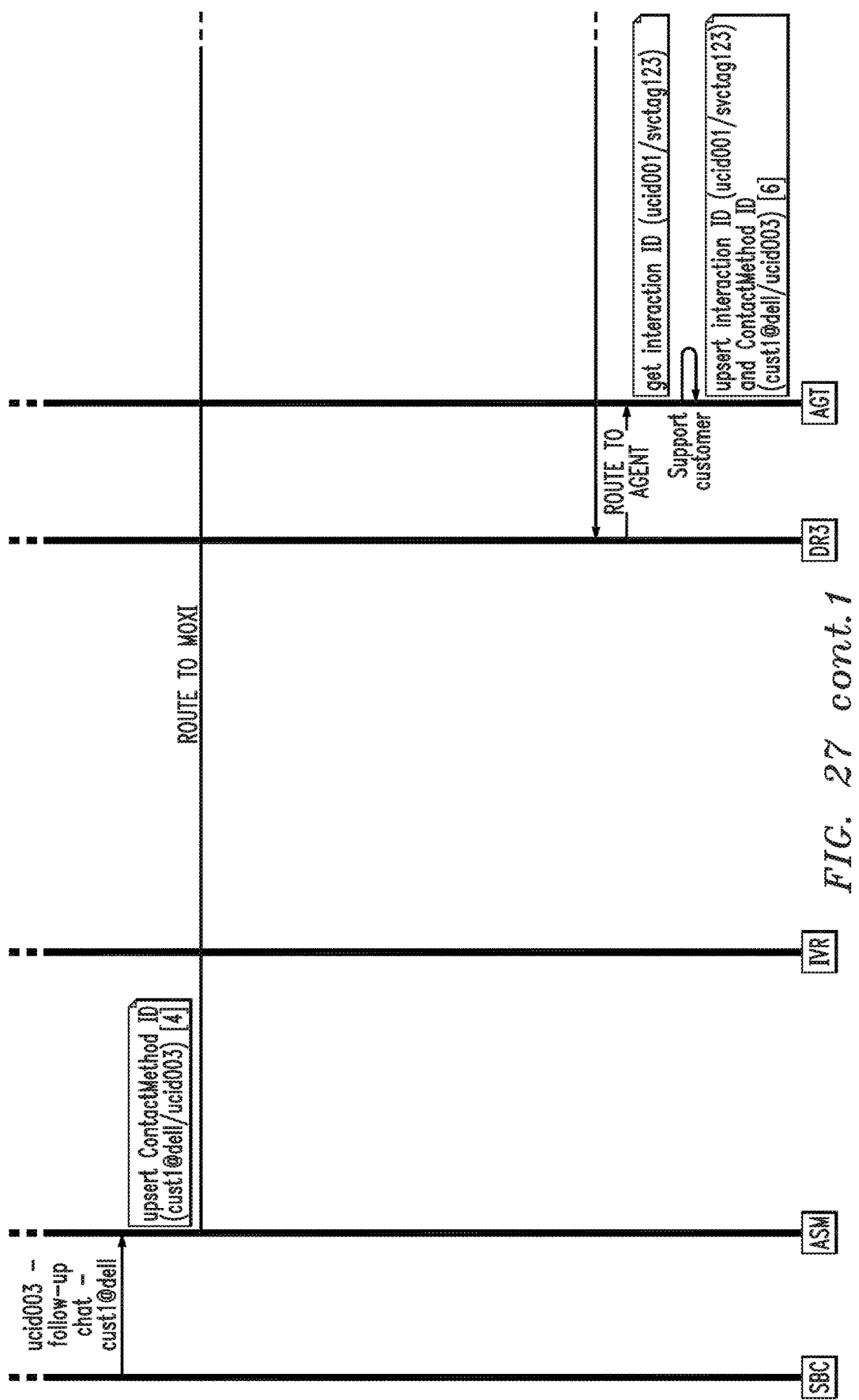
FIG. 27 cont.1

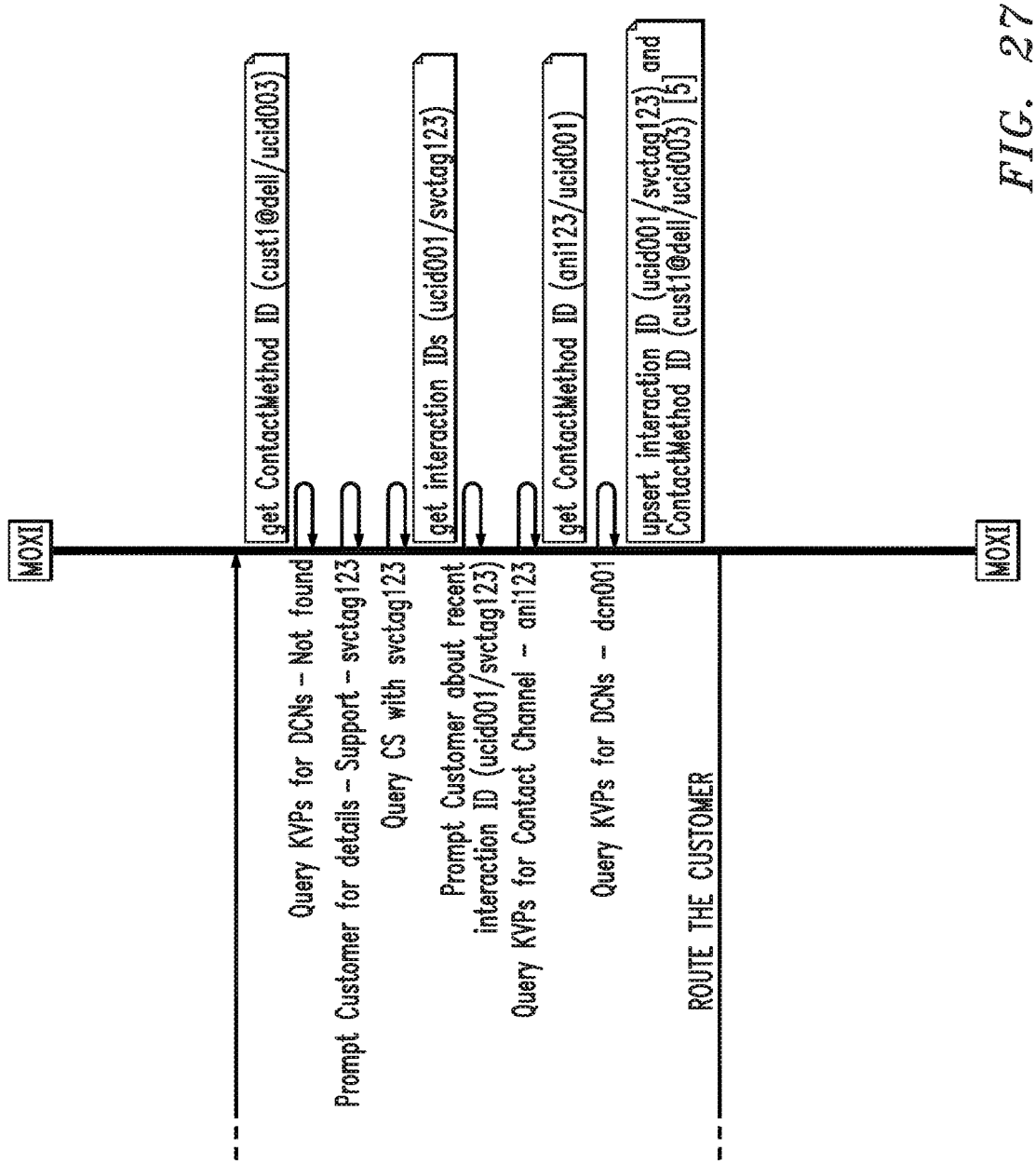
FIG. 27 cont.2

SAMPLE CONTEXT
3100

```
{
    "contextid": "DCIDe3r4t5y6u7i8o9p0",
    "groupid": "dcn9c8v7b6n5m4lj5f",
    "data": {
        "serviceTagy6u7i8o9p0":    "q1w2e3r4t5y6u7i8o9p0q1w2e3r4t5y6u7i8o9p1",
        "transfernumberi8o9p1":    "q1w2e3r4t5y6u7i8o9p0q1w2e3r4t5y6u7i8o9p2",
        "agentidf4g5h6j7k8l90":    "a1s2d3f4g5h6j7k8l90q1w2e3r4t5y6u7i8o9p3",
        "companynumber7k8l902":    "a1s2d3f4g5h6j7k8l90q1w2e3r4t5y6u7i8o9p4",
        "ordernumber35i8o9p03":    "q1w2e3r4t5y6u7i8o9p0q1w2e3r4t5y6u7i8o9p5",
        "cartnumber6u7i8o9p04":    "q1w2e3r4t5y6u7i8o9p0q1w2e3r4t5y6u7i8o9p06",
        "cartquestionf4g8l905":    "a1s2d3f4g5h6j7k8l90q1w2e3r4t5y6u7i8o9p7",
        "casenumberh6j7k8l906":    "a1s2d3f4g5h6j7k8l90q1w2e3r4t5y6u7i8o9p8",
        "dellcustomernumber07":    "q1w2e3r4t5y6u7i8o9p0q1w2e3r4t5y6u7i8o9p9",
        "DCID3r4t5y6u7i8o9p08":    "q1w2e3r4t5y6u7i8o9p0q1w2e3r4t5y6u7i8o9p0",
        "chattranscriptk8l909":    "https://www.websequencediagrams.com/1j12",
        "aninumber5h6j7k8l901":    "a1s2d3f4g5h6j7k8l90q1w2e3r4t5y6u7i8o1p1",
        "srcoftruth5y6u7i8o02":    "q1w2e3r4t5y6u7i8o9p0q1w2e3r4t5y6u7i8o1p2",
        "type3r4t5y6u7i8o9p45":    "q1w2e3r4t5y6u7i8o9p0q1w2e3r4t5y6u7i8o1p3",
        "a1s2d3f4g5h6j7k8l907":    "a1s2d3f4g5h6j7k8l90q1w2e3r4t5y6u7i8o1p14"
    }
}
```

CONTEXT DATA MANAGEMENT INTERFACE FOR CONTACT CENTER

The present application claims priority to the U.S. Provisional Patent Application identified as Ser. No. 62/734,614, filed on Sep. 21, 2018, and entitled "Contextual Data Management Interface for Customer Contact Center," the disclosure of which is incorporated by reference herein in its entirety.

FIELD

The field relates generally to information processing systems, and more particularly to context data management in contact center environments.

BACKGROUND

Customer contact center efficiency is critical for a business both in terms of customer satisfaction and its own productivity. A modern contact center typically provides service to customers via an Interactive Voice Response (IVR) system or some other information processing system. The system enables the customer to interact with one or more computing systems that enable the customer to provide input (e.g., queries and responses) via voice input as well as via computer input (e.g., keyboard, pointing device, dual-tone multi-frequency (DTMF) signaling, etc.). The forms of communication between the customer and the system are sometimes referred to as "channels" which may include, but are not limited to, an automatic number identification (ANI) or caller ID channel, a social media channel, a short message system (SMS) or text channel, an email channel, a voice call channel, an online chat channel, etc. Agents that respond to the customer query may be humans and/or automated systems (computer systems). Typically, data is collected and stored by the system corresponding to the customer journey through the customer support process. This data is sometimes referred to as "contextual data," "context data," or simply "context." However, effectively leveraging such context data to facilitate customer interaction can be challenging, especially when customer interaction involves multiple channels in the system.

SUMMARY

Illustrative embodiments provide context data management in a contact center environment.

For example, in one embodiment, a method comprises receiving a given contact instance for a given user of a contact center, wherein the contact center comprises a plurality of communication channels configured to enable the user to initiate a contact instance and wherein the given contact instance is received over one of the plurality of communication channels. The method further comprises one of generating and updating a context data management pattern in response to receiving the given contact instance, wherein the context data management pattern comprises a data structure of one or more records that maintain information relating to the given contact instance received over the one of the plurality of communication channels and information relating to one or more previous contact instances associated with the user received over one or more of the plurality of communication channels.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

Advantageously, illustrative embodiments provide a contextual data management system that comprises an application programming interface (API) that integrates with a given context store to enable different channels to share contextual information about customer interactions throughout the customer journey. Illustrative embodiments link customer interaction across contact channels via the generation and use of context data management patterns.

These and other embodiments of the invention include but are not limited to systems, methods, apparatus, processing devices, integrated circuits, and processor-readable storage media having software program code embodied therein.

BRIEF DESCRIPTION OF THE FIGURES

FIGS. 3A and 3B illustrate examples of records associated with a context data management pattern, according to an illustrative embodiment.

FIGS. 6-31 illustrate example implementations and use cases of context data management functionalities in one or more particular contact center environments, according to illustrative embodiments.

DETAILED DESCRIPTION

Figure 1:
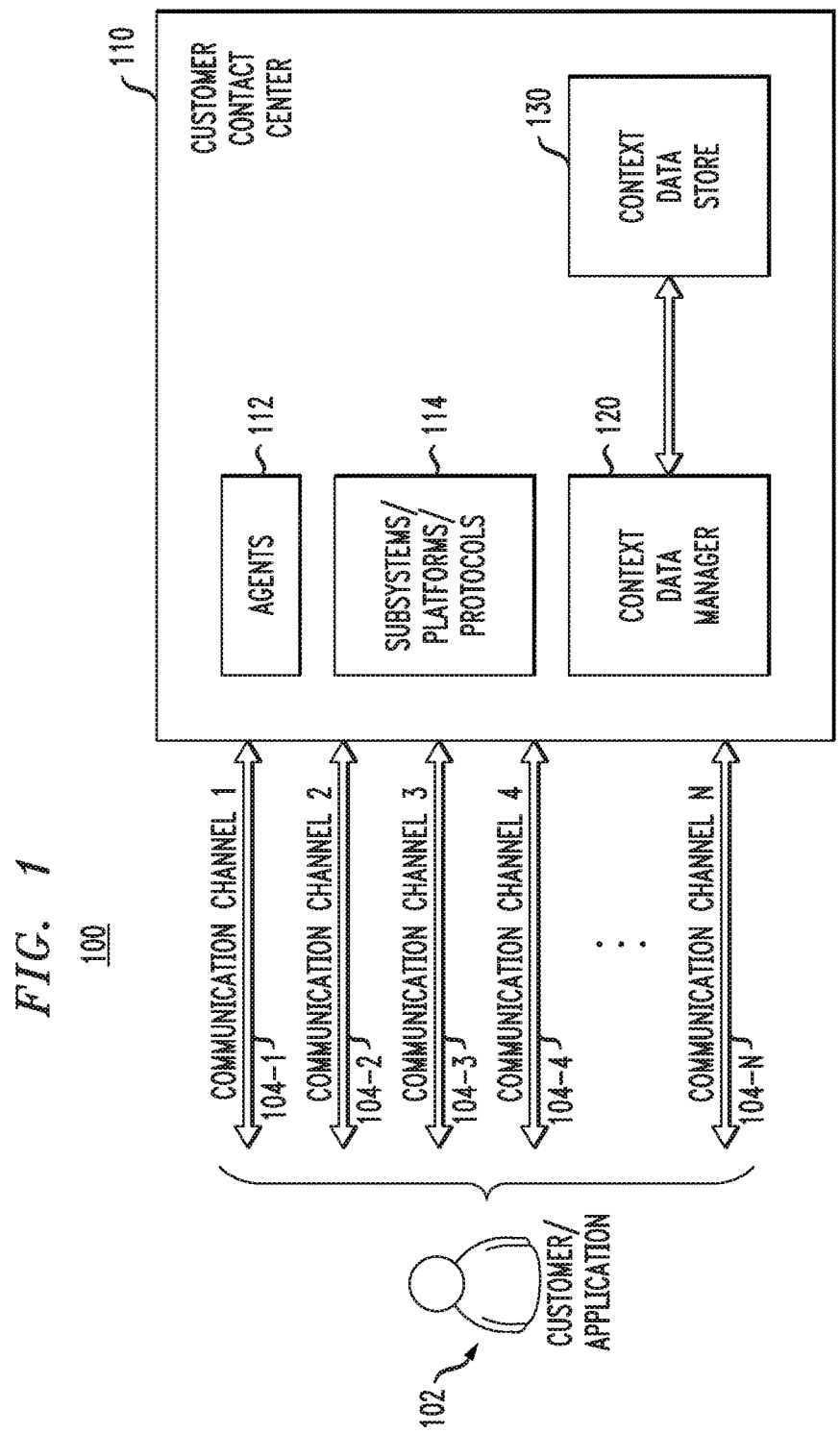
FIG. 1 illustrates a customer contact center environment with an information processing system having context data management functionalities, according to an illustrative embodiment.

Embodiments of the invention can be implemented, for example, in the form of information processing systems comprising computer networks or other arrangements of networks, clients, servers, processing devices and other components. Illustrative embodiments of such systems will be described in detail herein. It should be understood, however, that embodiments of the invention are more generally applicable to a wide variety of other types of information processing systems and associated networks, clients, servers, processing devices or other components. In some embodiments, information processing systems comprise cloud infrastructure. Accordingly, the term "information processing system" as used herein is intended to be broadly construed so as to encompass these and other arrangements. However, illustrative embodiments of an information processing system having context data management functionalities with a customer contact center environment are not limited to any specific processing platform architectures.

Before describing illustrative embodiments, consider the following scenario in a customer contact center managed by (or for) an enterprise that enables customers of the enterprise to contact the center over multiple communication channels such as an automatic number identification (ANI) or caller ID channel, a social media channel, a short message system (SMS) or text channel, an email channel, a voice call channel, and an online chat channel. During a voice call for technical support, assume a customer provides information about its system or product and is answered by a technical support agent that opens an incident report or ticket to be resolved in the next few days. In a subsequent online chat interaction between the same customer and the system, it would be advantageous for the system to be able to recover the past voice call interaction information (customer journey history) and take prompt action whether the customer would like to discuss its past interaction, as well as provide that information to the agent when transferred. In fact, it would be advantageous that all channels in the customer contact center be able to recover and update the customer journey history.

Illustrative embodiments realize that only providing a customer call center that simply receives customer contacts on multiple channels is not enough. It is desirable to keep track of all interactions, current and past, with the different channels and integrate the various communications platforms in a way that one customer's journey is known across the different channels and by all of the agents in the customer contact center. It is also realized herein that it would be desirable for the customer contact center to be able to proactively identify customers and past interactions and to integrate support services across the multiple communication channels. Illustrative embodiments enable such features by creating and managing context data management patterns, as will be explained in detail herein. Such patterns are used to record and manage customers' interactions with the customer contact center.

By effectively providing an "omnichannel" via multiple separate communication channels, a customer contact center according to illustrative embodiments improves the user experience. For example, omnichannel functionality provides a seamless interaction between the customer and services across different types of channels such as, but not limited to, voice, text, and email allowing customers to interact with the enterprise through multiple platforms, and switch between them without losing track of the customer contacts and journey. Applying this concept to the contact center environment involves integration and orchestration of channels when the customers contacts the enterprise. Regardless of channel or platform, it is realized that it is advantageous to provide the same or similar level of experience and quality to the customer.

FIG. 1 illustrates a customer contact center environment 100 with a plurality of communication channels 104-1, 104-2, 104-3, 104-4, . . . 104-N (which may be collectively referred to as channels 104 or each channel may be individually referred to as channel 104) available to a customer 102 to access a customer contact center 110. The customer 102 may interact with the communication channels 104 and thus the customer contact center 110 via one or more application programs running on a client device or some other computing device accessible by the customer 102. The customer contact center 110 provides context data management functionalities, as will be described in further detail herein, via a context data manager 120 which is operatively coupled to a context data store 130. It is to be appreciated that all or parts of the customer contact environment 100 may be considered an information processing system. While embodiments are not limited to any particular set of communication channel platforms or protocols, examples of types of communication channels that channels 104 may include are an ANI (caller ID) channel, a social media channel, an SMS (text) channel, an email channel, a voice call channel, and an online chat channel. Note that, as further illustrated in FIG. 1, customer contact center 110 comprises one or more agents 112 which can be individuals and/or computer systems that respond to a customer interaction with the customer contact center 110. Furthermore, block 114 generally illustrates the various subsystems, platforms and/or protocols that constitute a customer contact center, e.g., software, hardware, etc. that are used to support the multiple channels 104 and various customer services that are provided to address a customer request. Agents 112, the various subsystems, platforms and/or protocols 114 and context data manager 120 are operatively coupled to one another within the customer contact center 110.

In one or more illustrative embodiments, context data manager 120 is configured to provide an application programming interface (API) that integrates with context data store 130 to enable channels 104 to share contextual information about customer (102) interactions throughout the customer journey within the customer contact center 110. The context data manager 120 facilitates an organized, systematic approach to managing context data generated during customer interaction over multiple ones of channels 104 and stored in context data store 130. Context data store 130, in some embodiments, provides a centralized, scalable and low latency in-memory data cache for customer contact center 110 to store data. In some embodiments, the API of context data manager 120 provides one or more Representational State Transfer (RESTful) interfaces to clients, e.g., customer/application 102. In some illustrative embodiments, the API is implemented as one or more software plug-in (snap-in) modules. Also, it is to be understood that an API, as used herein, may itself include one or more APIs.

It is also to be appreciated that while context data manager 120 is depicted as functionally separate from context store 130 in FIG. 1, in some embodiments, one or more of the functionalities associated with context data manager 120 can be implemented within context store 130. Embodiments are not intended to be limited to any particular partitioning of functionalities. Rather, the specific contact center within which the functionalities are deployed can dictate the functionality partitioning.

Figure 2:
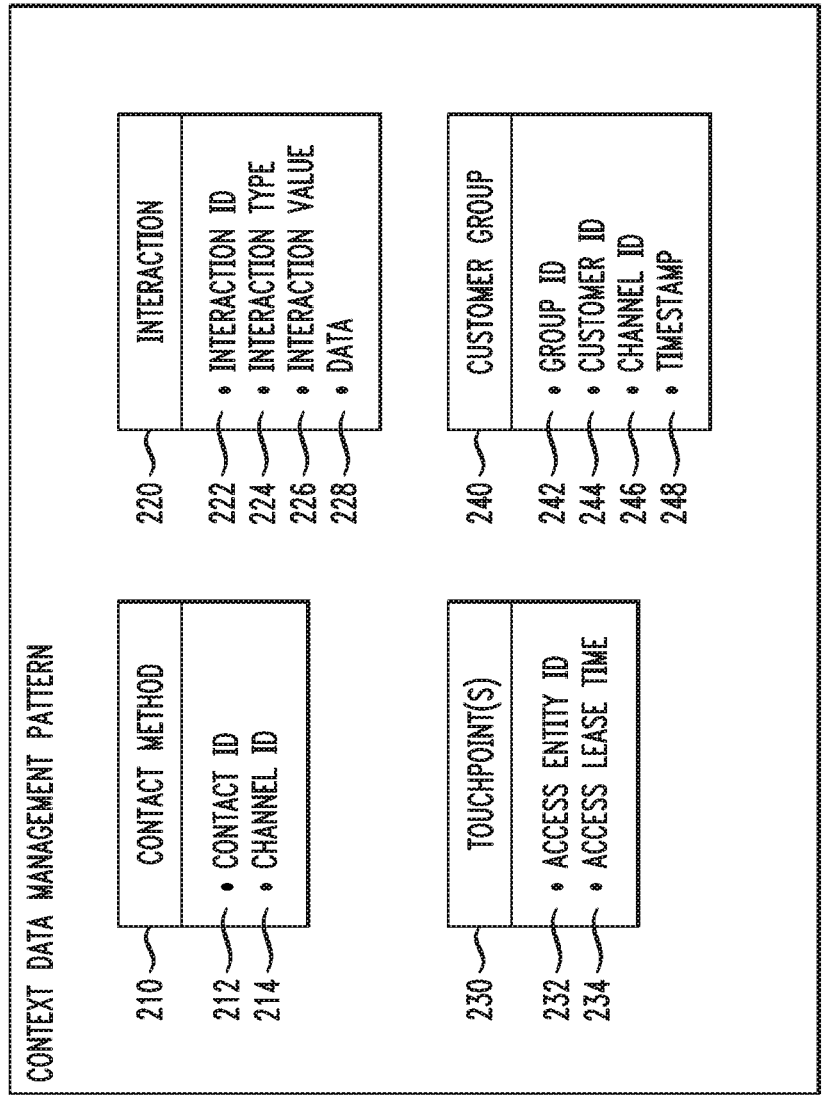
FIG. 2 illustrates a context data management pattern, according to an illustrative embodiment.

Turning to FIG. 2, a context data management pattern, according to an illustrative embodiment, is shown. As mentioned above, illustrative embodiments create and manage context data management patterns. A context data management pattern is a data structure that records and manages a customer's interactions (e.g., customer 102) with the customer contact center (e.g., 110). Context data manager 120 creates and manages such patterns.

For example, as shown in FIG. 2, a context data management pattern 200 comprises a contact method record 210, an interaction record 220, a touchpoint(s) record 230, and a customer group record 240. It is to be understood that alternative embodiments of a context data management pattern may have less records than the example shown in FIG. 2, or additional records not necessarily shown. For example, in some embodiments, a customer group record is not created when no customer grouping is needed or desired. The records 210, 220, 230 and 240 of pattern 200 each have their own attributes, as will be further explained, and collectively structure the data of a customer's interactions (e.g., customer 102) based on contact methods, interactions, touchpoints and groups.

As mentioned, context data management pattern 200 can be extended, adding more information, as needed or desired, to the records illustrated in FIG. 2. Further, context data management pattern 200 can be recorded directly to a database, relational or otherwise, in disk or in memory, or one or more objects of a programming language. Patterns such as 200 may also be available locally or through any network protocol that allows access to data.

Contact method record 210 is a type of record that holds the information of every contact a customer (102) makes with the customer contact center (110) over any and all channels 104 over which the contact is made. Within contact method record 210, context data manager 120 keeps track of (stores and updates) a Contact Identifier (ID) 212 (e.g., Universal Contact ID or UCID, Call ID) that can be used to track an interaction with the customer contact center 110. Thus, in illustrative embodiments, Contact ID refers to the Call ID for a voice contact, or any other unique Contact ID for other channels. UCID is an example of a Universal (and unique) Contact ID that can be used to track a contact regardless of the channel type. For example, Contact ID 212 can be "1 (PK)," "2 (PK)," etc. PK is the Contact ID that can be used to uniquely identify a contact. From a contact method record perspective, it is the Primary Key (PK). An interaction record (as will be further explained below) also has its own Primary Key and a Foreign Key (FK) that references the contact method record (Contact ID PK). From the perspective of the pattern shown in FIG. 2, PK and FK are generically depicted because the contact center identifiers can differ depending on the environment in which the pattern is being implemented on.

Furthermore, within contact method record 210, context data manager 120 keeps track of (stores and updates) a Channel Identifier (ID) 214 that can be used to identify the type of channel platform that generated the interaction and the entity that generated it such as a phone number, email address or other. For example, Channel ID can be 02132321 for an ANI channel and bob@dell.com for an email channel. Note that while contact method record 210 illustrates one Channel ID, in one or more illustrative embodiments, the record contains a different Channel ID for each channel 104 that the customer 102 uses to contact the customer contact center 110. In additional or alternative embodiments, contact method record 210 contains multiple sub-records wherein each sub-record represents a different one of the channels 104 used by the customer 102 to contact the customer contact center 110. The sub-records are thus linked or otherwise associated with one another to form the contact method record 210.

FIG. 3A shows an example with two contact method records 310-1 and 310-2 with the attributes mentioned above. Note that 310-1 and 310-2 can be considered separate contact method records or sub-records of the same contact method record.

Returning to FIG. 2, interaction record 220 is a type of record that contains data that reflects the customer intent during a given contact. Within interaction record 220, context data manager 120 keeps track of (stores and updates) an Interaction ID 222, an Interaction Type 224, an Interaction Value 226 and Data 228. Interactions are generated when entities (agents, subsystems, platforms, protocols, etc.) in the customer contact center 110 already know what the customer intent is and can provide data that can be consumed by other systems (e.g., part of 114) during the current or a future contact. Thus, interaction record 220 contains Interaction ID 222 which is an identifier of that interaction which is usually the same as the Contact ID 212 from contact method record 210 so that the interaction record 220 can be later retrieved as well as meaningful information about that contact such as any customer input, type of interaction (Interaction Type 224) and customer relationship management (CRM) data for screen pop. An Interaction Value 226 is the identifier of a given Interaction Type 224. For instance, if the customer called for warranty or parts replacement, the Interaction Type 224 may be "Tech Service" and the Interaction Value 226 may be the ID that identifies the Service such as a Service Request Number or a Case Number. By way of another example, Interaction Type 224 could be for "Financial Service" and an Account Number or a Customer Care Service and an Order/Dispatch Number could be the Interaction Value 226. Data 228 could be any data relevant to the type of interaction.

By way of example only: Interaction ID 222 can be "1 (PK)," "1 (FK)," "2 (PK)," "2 (FK)," etc.; Interaction Type 224 can be "ORDER," "SERVICE," etc.; Interaction Value 226 can be "123456," "A31SSD09X," etc.; and Data 228 can be a (key: value) pair. In additional or alternative embodiments, interaction record 220 contains multiple sub-records wherein each sub-record represents a different customer interaction. The sub-records are thus linked or otherwise associated with one another to form the interaction record 220.

FIG. 3B shows an example with two interaction records 320-1 and 320-2 with the attributes mentioned above. Note that 320-1 and 320-2 can be considered separate interaction records or sub-records of the same interaction record.

Returning again to FIG. 2, touchpoint(s) record 230 is a type of record used to keep track of metadata of the entities that generated, updated or retrieved a contact method record 210 and/or an interaction record 220. By way of example only, if a channel agent (an agent 112 associated with a given one of the channels 104) retrieves the content of a given Contact ID, the touchpoint record allows to keep track that the content was accessed. In order to keep only relevant and most recent data, touchpoints can also assist on whether to keep content within memory by renewing a lease time whenever content is accessed. Thus, as illustrated in FIG. 2, touchpoint(s) record 230 comprises an Access Entity ID 232 and an Access Lease Time 234. In additional or alternative embodiments, touchpoint(s) record 230 contains multiple sub-records wherein each sub-record represents a different touchpoint. The sub-records are thus linked or otherwise associated with one another to form the touchpoint(s) record 230.

Customer group record 240 is a type of record that manages the concept of groups within the customer contact center 110. Groups are optional but the pattern 200 can support implementation of grouping of Channel IDs to associate different customers across channels and that share the same Channel ID such as a household or a small business customer account. Thus, as illustrated in FIG. 2, customer group record 240 comprises a Group ID 242, a Customer ID 244, a Channel ID 246 and a Timestamp 248. In additional or alternative embodiments, customer group record 240 contains multiple sub-records wherein each sub-record represents a different group. The sub-records are thus linked or otherwise associated with one another to form the customer group record 240.

Figure 4:
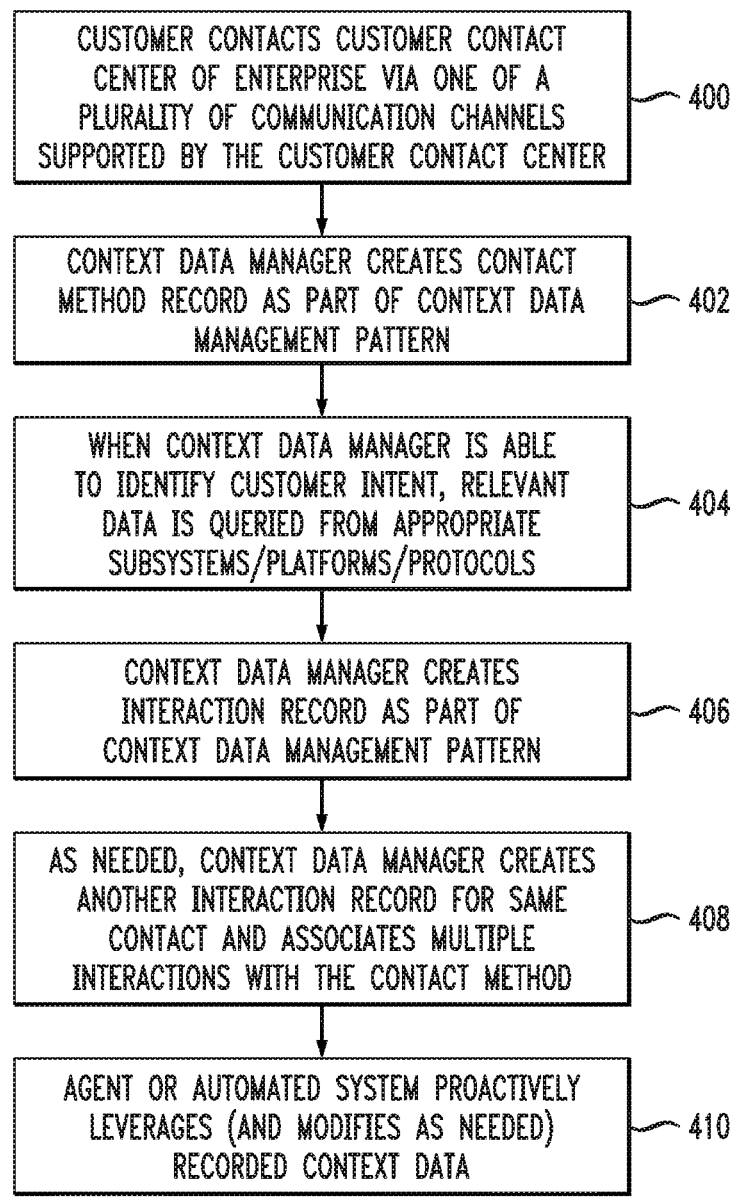
FIG. 4 illustrates a context data management methodology, according to an illustrative embodiment.

FIG. 4 illustrates a context data management methodology, according to an illustrative embodiment. The methodology illustrates one example set of steps that are performed by context data manager 120 in conjunction with customer contact center environment 100 of FIG. 1. Many straightforward variations on the context data management methodology of FIG. 4 are contemplated to be within additional or alternative embodiments.

In step 400, customer 102 contacts customer contact center 110 via one of a plurality of communication channels 104 supported by the customer contact center 110.

In step 402, a context data manager 120 creates a contact method record 210 as part of context data management pattern 200.

In step 404, when context data manager 120 is able to identify customer intent, relevant data is queried from appropriate subsystems/platforms/protocols 114.

In step 406, context data manager 120 creates interaction record 320-1 as part of context data management pattern 200.

In step 408, as needed, context data manager 120 creates another interaction record 320-2 for same contact and associates multiple interactions with the contact method record 210.

In step 410, agent or automated system 112 proactively leverages (and modifies as needed) recorded context data. In some embodiments, backend systems associated with the customer contact center 110 (such as, e.g., routers) redirect the contacts and the context data manager 120 ensures that the contextual data flow is kept consistent and accessible between different systems.

Note that context data management pattern 200 can be stored at the customer contact center 110, at context data store 130, or at some combination thereof. Also note that depending on the particular configuration of the contact center, one or more of the above steps of the context data manager 120 can be implemented within the context store 130.

Figure 5:
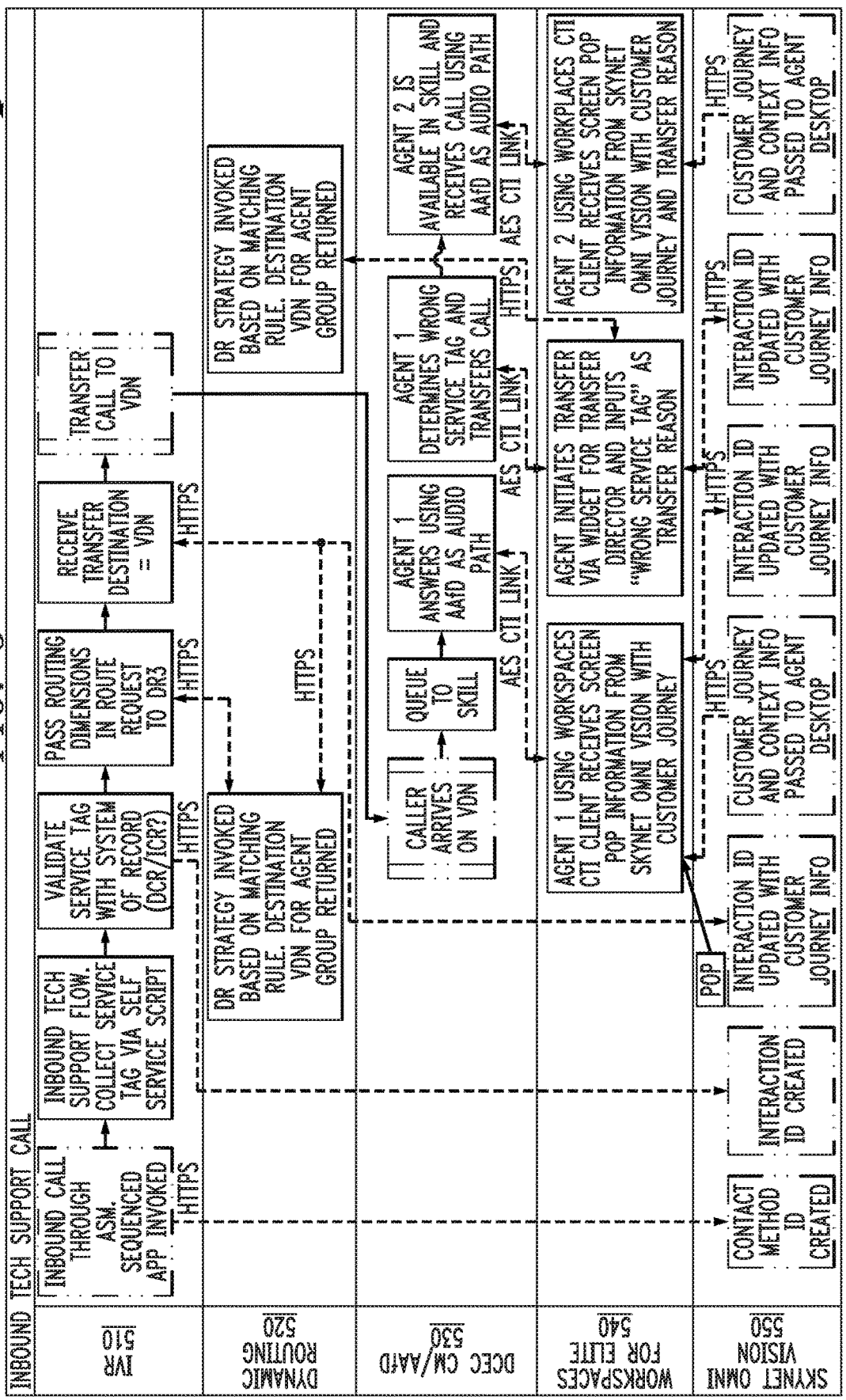
FIG. 5 illustrates a message flow for an inbound technical support call in a customer contact center environment with an information processing system having context data management functionalities, according to an illustrative embodiment.
Figure 6:
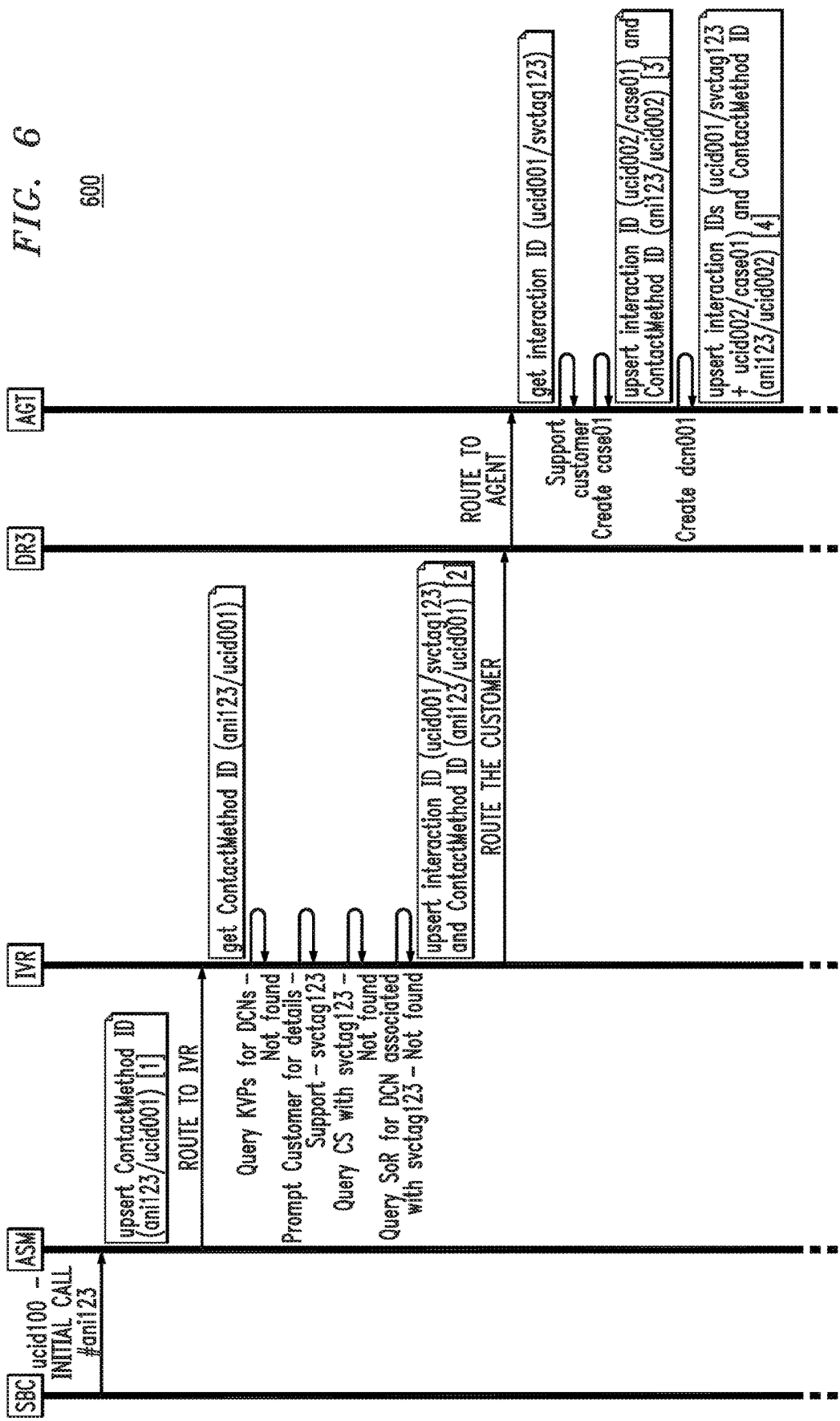

FIG. 5 illustrates yet another example of a context data management methodology according to an illustrative embodiment, in this case, in terms of a message flow 500 for an inbound technical support call in a customer contact center environment with an information processing system having context data management functionalities such as context data manager 120. In the message flow of FIG. 5, middleware API 550 represents at least a part of context data manager 120.

More particularly, message flow 500 depicts how a customer contact call flows through a contact center environment and at which points the contact center systems invoke the context data manager 120 to write and retrieve data. In the message flow of FIG. 5, layer 510 represents an IVR system, layer 520 is a dynamic routing protocol, layer 530 is an agent layer, layer 540 is an agent application layer, and layer 550 is a middleware API that represents at least a part of context data manager 120.

In this example, the IVR system 510 triggers the context data manager via API 550 to create the contact method record when the call arrives in the contact center back end, and after the customer has navigated the IVR menu and the intent is identified, IVR triggers the context data manager via API 550 to create the interaction record tying the customer intent to the contact method record.

As the call flows through the systems and a destination call center agent queue is identified (routing 520), the context is updated at API 550 via agent application 530/540, keeping track of the customer journey. Once the call lands on an agent, the customer journey is presented to the agent in form of screen pop data and the customer journey is again updated at API 550 via agent application 530/540 with the agent information. When the call is transferred to a second agent, the context is once again updated at API 550 via agent application 530/540 with the customer journey to be later presented to the next agent or provided during a future contact from the same customer.

EXAMPLE IMPLEMENTATIONS/USE CASES

In one example implementation, customer contact center 110 is a Dell Contact Center and context data manager 120 is implemented in the customer contact center 110 at least in part by a Skynet Snap-In API also referenced as Skynet Omni Vision (Dell Products L.P., Round Rock, Tex.), while context data store 130 is implemented via a Context Store. Further implementation details and illustrative use cases for such a Skynet/Context Store implementation are described below in conjunction with FIGS. 6 through 31. In the example implementation, context data management is referred to as intelligent contact management. Note that acronyms used throughout the description to follow are either known from the context in which they are used or otherwise defined when used or defined in one or more tables below.

A. Skynet API

1. Introduction

Along with the Skynet Snap-in API, Context Store (CS) is an important part of the Intelligent Contact Management (ICM) implementation. As part of an ICM implementation, Context Store is configured to contain context that are used to correlate Contacts to customers in real time. There is a single source of truth that can readily be used to identify a customer to their Dell Customer Number (DCN) or Party Id (PID) using their channels and/or intent. Currently this system contains a lot of information but there are gaps and duplicates that mean it is not easy to identify returning customers to the Dell Contact Center and what is their intent for making Contact. Context Store collects context data from multiple Contact Center applications to help address this problem. This context data is an amalgamation of a system of record data and learned data. This context data is used to enhance routing and inform agents.

As well as safe-guarding the data that is in Context Store, the Skynet Snap-In API also encapsulates Business Logic that is part of the ICM implementation. The API represents the initial business needs but can easily be expanded to implement channel specific logic or incorporate new actors in the flow.

As part of ICM implementation, certain contexts are created and updated in Context Store for the Business Process to work correctly. As depicted in an example in FIG. 6 as ICM implementation flow 600, the following API calls are included:

| Actor | API | Rational |
| --- | --- | --- |
| SBC | POST | Keep record of all Voice Calls that enter the Contact Center, Upserting ContactMethodContexts. |
| IVR | GET | Retrieve details of any open customer queries, ContactMethodContexts and InteractionContexts. |
| IVR | POST | Update the ContextType and potentially the InteractionContext with information collected through the interrogation phase. |
| AGENT | GET | Retrieve InteractionContext when a call is answered. |
| AGENT | POST | Create (or Update) an InteractionContext when an Agent answers a Customer call. |

2. Architecture

Figure 7:
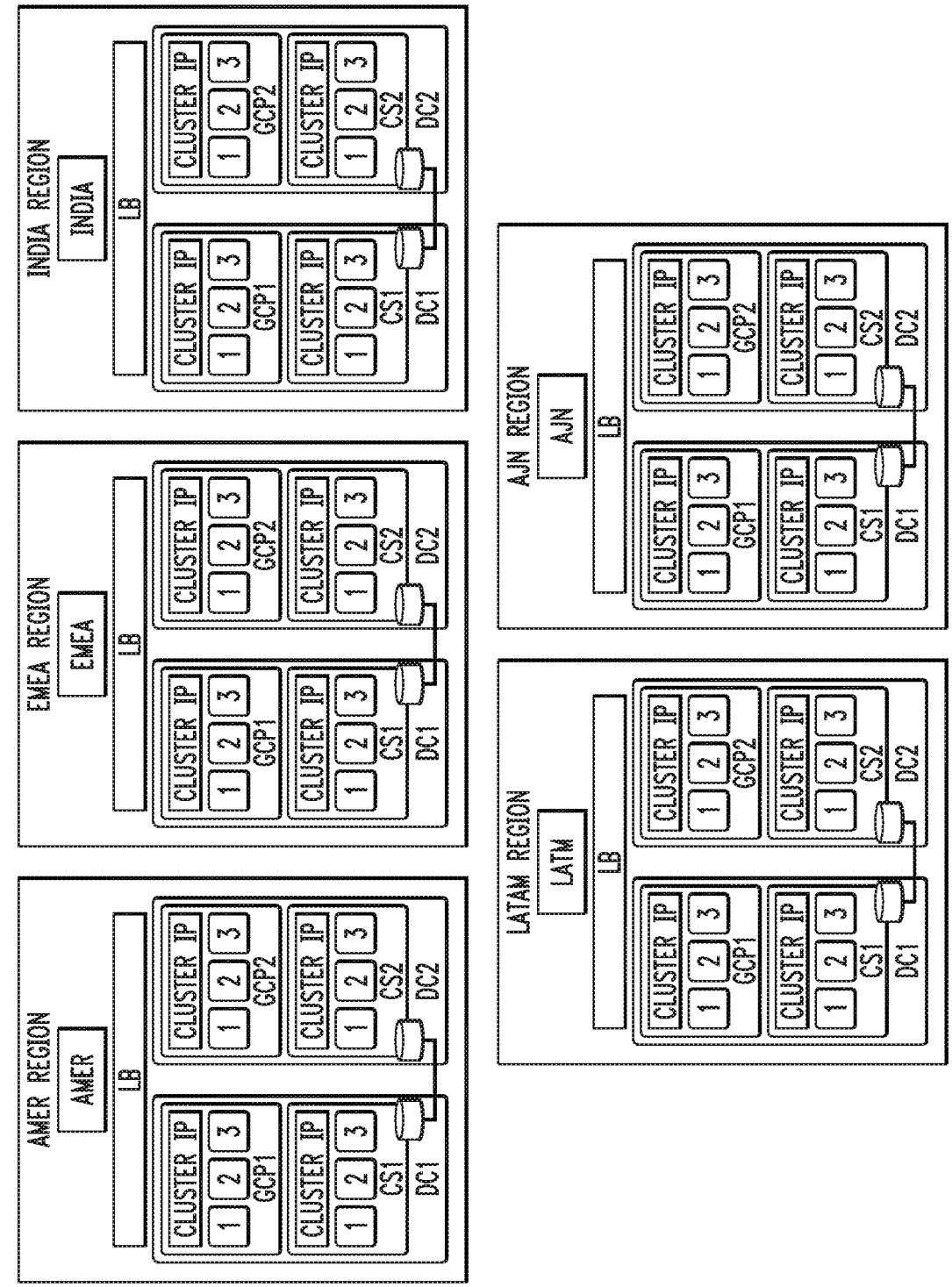

In this exemplary implementation, Context Store deployment comprises five regions as depicted in architecture 700 in FIG. 7. Each Contact Center (also referred to herein as a Contact Centre) in a Region interacts with the local Context Store in that region. The Contexts stored in an individual region are not synchronized across regions in this example. Currently there is no geographic redundancy between regions.

Figure 8:
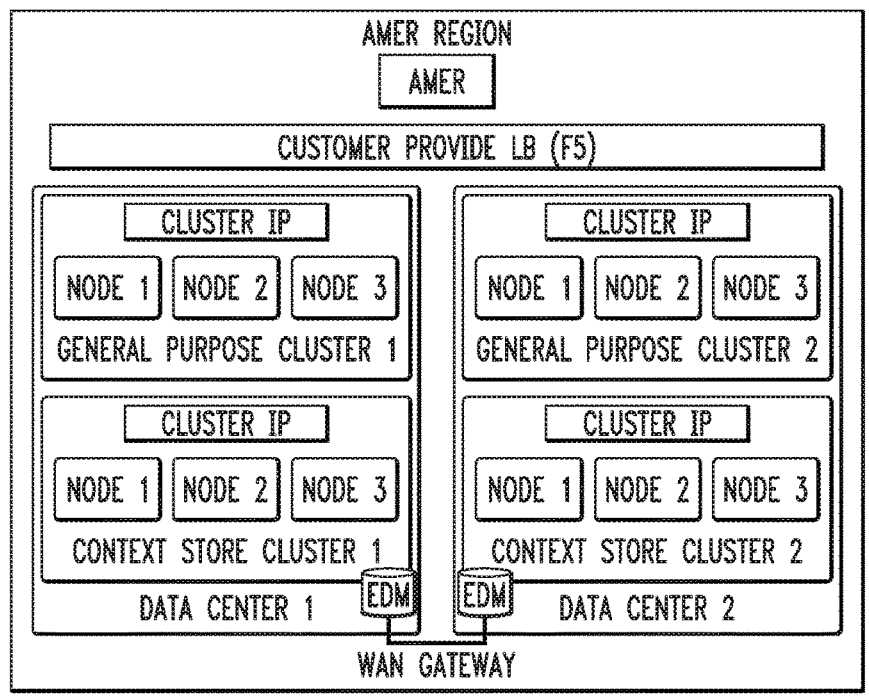

As illustrated in architecture 800 in FIG. 8, each Region has two Context Store clusters and two General Purpose Clusters. These clusters are accessed through a Customer Provided Load Balancer (LB). The Contact Center has no direct access to the Context Store clusters, its access is through Dell Skynet Snap-In which is accessible through the Customer Provide Load Balancer. If Screen Pop is used then, this can be exposed through the Customer Provided Load Balancer. The Skynet Snap-In accesses the Context Store through the Cluster IP. Each Cluster has three nodes in this non-limiting example.

Each Context Store Cluster in a region is configured to run in Active/Backup mode. The Contexts stored in the region's Context Store Clusters are synchronized through the use of a wide area network gateway (WAN Gateway).

3. API Specifications a. SBC API

When a call arrives at the session border controller (SBC), there is an upsert call to Context Store to either create a new ContactMethod context or update an existing one with a new touchpoint; <DCID>:<Timestamp>. This ContactMethod context is used to link the ANI to the DCN. When a Customer returns to the Context Store using the same ANI, the IVR will be able to retrieve the correct DCN or recent Interaction Context by DCID captured in the ContactMethod Context's touchpoint list.

When this method is called, it internally passes the DCID as a Touchpoint to the Context Store upsert call. The ContactMethod Touchpoint metadata can be used to determine the activity on this ContactMethod as well as build a visualization.

Post

The REST interface will support a POST method which will take an ANI and DCID as an input and will return an appropriate error code

```
Method Name
https://fqdn/skynet/1.0/voice/unassisted/asm
Input
{
    "contextid":"ani",
    "touchpoint":"dcid"
}
Output
{
    "description":"success",
    "status code":"200"
}
```

Status Codes are dependent on the design.

Result

A new context will be created with the default lease. If a context already exists the lease will be refreshed with the default lease.

| Name | Value | Description |
|---|---|---|
| ContextID | ANI | This value might represent other channels such email |
| Touchpoint | DCID | A touchpoint will be added for this Contact containing the Dell Contact ID(DCID) and the timestamp this was added. |

-continued

| Name | Value | Description |
|---|---|---|
| | | If a customer with a matching ANI has returned several times then there will be multiple unique DCID touchpoints. | b. IVR API

When a call arrives at the IVR, the current business process checks if there is a ContactMethod Context associated with this ANI. If a Context is found then it can be inferred that this new call is part of an on-going session with the customer over the last seven days (in this example) and then the Skynet widget can analyse the context to try to determine intent. Using this information, the IVR prompts the Customer with a prompt such as "Is this call relating to your previous Support request?" as opposed to having to perform the interrogation phase again.

GET ContextType

The IVR will supply the ANI as part of the GET command. The implementation of this GET command will retrieve a ContactMethod Context from Context Store using the ANI as the Context ID. Skynet supplies the IVR identifier as the touchpoint for the CS GET REST call. If this customer has called into the Contact Center in the last seven days (this is the default lease of the Context that the Context Store implementation has been set to), there will be a Context in the CS.t.

Exception—Under normal circumstances, the call should have first arrived at the SBC and created a Context using the ANI. If for some reason CS does not return a Context for that ANI, then Skynet will:

1. log the error
2. Create a new Context with the ANI
3. Return the newly created Context Once the Context is retrieved from CS, Skynet will need to analyse key value pairs (KVPs) or touchpoints that are contained in the Context. The Touchpoints will contain the DCIDs that are associated with a timestamp. The KVP's will contain DCNs that are associated with a timestamp. The Skynet Snap-In will analyse the timestamps to determine the most relevant as well as the timestamp associated with it. These DCID's correlate to ContextInteractions that have currently taken place. The Skynet Snap-In will use the timestamp to sort the most recent Interactions and use business logic to determine which are the most relevant. For a consumer customer, there will typically be a low number of DCIDs as a regular consumer might not have that many concurrent interactions, whereas an Enterprise Customer might have tens to hundreds of concurrent interactions representing all their employee cases coming in on the same ANI.

When the timestamps are sorted the DCID's can be analysed to determine what type of interaction took place i.e. the $4^{th}$ digit will identify the Interaction Type's Service Tag, Case Number, Order Number etc. The GET method uses a global dynamic variable that specifies how many DCID's to return to the IVR.

Currently, this implementation does not use the DCID to lookup every corresponding interaction, but for Transformational Use Cases, this method could return the context that matches this DCID. The InteractionContext contains information such as:

contextId=DCID
AliasId=Interaction Type (e.g., Case No.)
GroupId=DCN.

KVPs contain information about the interaction and inherited contexts.

```
Method
    GET https://fqdn/skynet/1.0/voice/unassisted/dcid/{contextId}/
    queries?count=2
Input
    Path Parameter: "contextId":"ani",
    Query Parameter: "count":"2",
    Query Parameter: "touchpoint":"IVR Id"
Output
{
    "contextId": "samplecontextId",
    "data": {"Order":"Wed Nov 28 08:43:10 CST 2017",
        "DCN6789":"Wed Nov 28 08:43:10 CST 2017",
        "ServiceTag":"Wed Nov 29 08:45:10 CST 2017",
        "DCN1234":"Wed Nov 29 08:43:10 CST 2017"},
    "audit": [
    "Wed Nov 29 08:43:10 CST 2017,11191000831511959996",
    "Wed Nov 29 08:45:10 CST 2017,11191000555555555555"
    ]
}
```

Most recent excluding the current call:

```
{
"contextId": "samplecontexId",
"data": {"ServiceTag":"Wed Nov 29 08:45:10 CST 2017",
    "DCN1234":"Wed Nov 29 08:45:10 CST 2017"},
 "audit": ["Wed Nov 29 08:45:10 CST 2017,11191000555555555555"]
}
```

Status Codes are dependent on the design.
Result

The Context touchpoint is updated to reflect that a GET from the IVR has occurred. The assumption is that this API method call is mandatory to the ICM implementation business process and will always be called. Also, this API method call is only called once over the duration that this call remains active in the Contact Center. Based on these assumptions, the TRANSFER COUNT on the context will be setback to zero so that the number of times a call may be redirected in the Contact Center can be accurately track.

GET ContextInteraction

For Transformational Use Cases, the IVR may want to use DCIDs that are contained in the ContextType to look up details on the Context Interaction. This information allows the IVR to be more specific in its prompt, i.e., 'is this call in relation to Case XYZZY'.

This method may merge CS reads from get Context and get Context Metadata to return all information related to the call.

```
Method
 GET https://fqdn/skynet/1.0/voice/unassisted/{interactiontype}/
 {aliasId}/?contextId=dcid&touchpoint=IVR
 or
 GET https://fqdn/skynet/1.0/voice/unassisted/{contextId}/
 ?touchpoint=IVR
 Input
     PathParam: "contextId": "value"
     QueryParam: "touchpoint": "IVR Id"
 Output
 {
     "aliasId": "T800",
     "groupId": "Cyberdyne Systems",
     "data": {
         "interactionType":"OrderNo",
         "OrderNo":"T800",
         "dpid":"T1000"
```

```
     }
 }
```

Error Codes are dependent on the design.
Result

The Context touchpoint is updated to reflect that a GET from the IVR has occurred.

PUT ContextInteraction

As part of the business process, before the Call is routed, the IVR will call this API method. This API will call the Context Store upsert method to update an existing Context or create a new InteractionContext. This Context will contain agreed information collected as part of IVR interrogation phase, i.e., service tag.

In addition, this method will also call the ContextType method using the ANI so that it can add the DCID and Timestamp as a KVP to the ContactMethodContext.

Note that the customer might abandon the call before an agent is matched or during the routing. Skynet Snap-In makes provision for this exception use case.

```
Method
POST https://fqdn/skynet/1.0/voice/unassisted/createInteractionId/
{contextId}/{touchpoint}
PathParam: contextid
PathParam: touchpoint
Input
{
    "groupId":"DCN",
    "data":
    {
        "interactionType":"ServiceTag",
        "serviceTag":"xxxxxx",
        "transferCount":"0"
    }
}
Output
{
"description":"success",
"status code":"200"
}
```

Status Codes are dependent on the design.
Result

The result will be Context with ContextId=UCID either updated or created and the ContextType updated with the DCID=UCID. There will be a touchpoint record of this interaction for future purposes.

c. Desktop API
(i) Ringing
   Get

When a Call is ringing at an agent's desktop, the desktop retrieves the InteractionContext for the DCID. This method retrieves the InteractionContext that matches the AliasId using the AgentID touchpoint. This API Call serves the dual purpose of returning relevant information that could be used in screen pop while the call is alerting as well as tagging the context with the touchpoint in the case a RONA might occur.

Note that some agents are configured with auto answer so they may not see the ringing event.

```
Method
 GET:http://fqdn/skynet/1.0/voice/assisted/agentDesk/<aliasId>/
 ringing?interactiontype="caseNumber"&touchpoint="AgentId"
 Input
     QueryParam: "interactiontype":"caseNumber",
```

-continued

```
Path Param: "aliasId":" 111-222-333",
QueryParam: "touchpoint":"AgentID"
Output
{
    "transferCount":0,
    "ani":"5551212",
    "aliasId":"alias",
    "interactionType":"CaseNumber",
    "date":"04/08/1997",
    "direction":"in",
    "Authentication":"no"
}
```

Status Codes are dependent on the Design.
Result

The InteractionContext touchpoint is updated as part of the Context.

(ii) Answered

Get

When a Call is answered at an agent's desktop, the desktop retrieves the InteractionContext for the UCID. This method retrieves the Interaction Context that matches the Alias using the AgentID touchpoint. This API Call serves the dual purpose of returning relevant information that could be used in screen pop when the call is answered, launch additional applications and be a marker that the call has been answered successfully.

```
Method
    GET: http://fqdn/skynet/1.0/voice/assisted/agentDesk/
    <interactionType>/<alias>/answer?touchpoint=AgentID
Input
    Path Parameter: "interactiontype":" caseNumber"
    Path Parameter: "aliasId":"111-222-333"
    Query Parameter: "touchpoint":" AgentID"
Output
{
    "transferCount":0,
    "ani":"5551212",
    "aliasId":"alias",
    "interactionType":"CaseNumber",
    "date":"04/08/1997",
    "direction":"in",
    "Authentication":"no"
}
```

Status Codes are dependent on the design.
Result

The InteractionContext touchpoint is updated as part of the Context.

Put

When a call is answered the customer may want to update the context with additional KVPs. This method validates that the new KVPs are consistent with business standards and do not incorrectly overwrite any KVPs, Alias IDs, etc., that are critical to business processes.

Note that one KVP that is Agent:AgentID, with the intention that it be used to determine a preferred agent when a customer returned on the same interaction. The issue with using Agent as a KVP is in a conference scenario where it is difficult without a direct desktop call to establish which Agent owns this call. Also, current Contact Center environments may not fully support all scenarios where a preferred agent is suitable.

```
Method
    http://fqdn/skynet/1.0/voice/assisted/agentDesk/<interactionType>/
```

```
    <alias>/answer?touchpoint=AgentID
Input
    Optional additional KVPs to be stored as part of the Contact:
    Path Parameter: "interactiontype":" caseNumber"
    Path Parameter: "aliasId":"111-222-333"
Body:
{
    data: {
        "string":"string"
    }
}
Output
{
    " description":"success",
    "errorcode":""
}
```

Status Codes
   TBD Design team
Result

The ContextInteraction is updated with the AgentID touchpoint and will be updated with any valid KVPs.

(iii) Terminate

Put

When a call is terminated, the customer may want to update the context with additional KVPs. This method validates that the new KVPs are consistent with business standards and do not incorrectly overwrite any KVPs, Alias IDs, etc., that are critical to business processes.

```
Method
    http://fqdn/skynet/1.0/voice/assisted/agentDesk/<interactionType>/
    <alias>/termiante?touchpoint="AgentID"
Input
    Optional additional KVPs to be stored as part of the Contact:
Path Parameter: "interactiontype":" caseNumber"
Path Parameter: "aliasId":"111-222-333"
Query Parameter: touchpoint="AgentID"
Body:
{
    data: {
        "string":"string"
    }
}
Output
{
"description":"success",
"status code":"201"
}
```

Status Codes are dependent on the design.
Result

The ContextInteraction is updated with the AgentID touchpoint and will be updated with any valid KVPs.

(iv) Conferenced

Put

When a call is conferenced, the customer may want to update the context with additional KVPs. This method validates that the new KVPs are consistent with business standards and do not incorrectly overwrite any KVPs, Alias IDs, etc., that are critical to business processes.

```
Method
    http://fqdn/skynet/1.0/voice/assisted/agentDesk/<interactionType>/
    <alias>/conferenced?"touchpoint":"AgentID"
Input
    Optional additional KVPs to be stored as part of the Contact:
    Path Parameter: "interactiontype":" caseNumber"
    Path Parameter: "aliasId":"111-222-333"
```

-continued

```
    Query Parameter: touchpoint="AgentID"
Body:
{
    "data": {
        "string":"string"
    }
}
Output
{
"description":"success",
"code":"200"
}
```

Status Codes are dependent on the design.

Result

The ContextInteraction is updated with the touchpoint of the AgentID. Any additional valid KVPs will be added, i.e., agent notes.

(v) Transfer

Put

When a call is transferred, the customer may want to update the context with additional KVPs. This method validates that the new KVPs are consistent with business standards and do not incorrectly overwrite any KVPs, AliasIds, etc., that are critical to business processes.

This method will update the transfer count by one. Note that the transfer count is reset when the call comes through the IVR and this current customer interaction is completed in the Contact Center and now they are returning to the Contact Center as part of a new session. The assumption here is that once a call has entered the Contact Center, it will not return to the IVR in the current Contact Center session.

```
    Method
        PUT http://fqdn/skynet/1.0/voice/assisted/agentDesk/
        <interactionType>/<alias>/transfer?touchpoint="AgentID"
    Input
        Optional additional KVPs that you want to store as part of the
        Contact:
        Path Parameter: "interactiontype":" caseNumber"
        Path Parameter: "aliasId":"111-222-333"
        Query Parameter: touchpoint="AgentID"
    {
        "data": {
            "string":"string"
        }
    }
    Output
    {
        "description":"success",
        "code":"200"
    }
```

Status Codes

TBD Design team

Result

The InteractionContext has been updated with the AgentID touchpoint. The transfer count has been increased by one.

(vi) Inherit

Post

When a call escalates from one InteractionType and another new InteractionContext is created to capture future interactions. This method ensures that both InteractionContexts have a KVP that links one to the other.

```
Method
    http://fqdn/skynet/1.0/voice/assisted/agentDesk/<interactionType>/
        <alias>/inherit
Input
    Create new interationId (body) and Update existing interationId
    (path).
    Path: {
    "interactiontype":"serviceTag",
    "aliasId":"111-222-333",
    }
Body: {
    "interactiontype":"caseNumber",
    "aliasId":"333-222-111",
    "touchpoint":"AgentID"
    "Data": {
        "inherited id":"serviceTag",
        "transferCount":"old_transferCount"
    }
}
Output
{
    "description":"success",
    "code":"200"
}
```

Status Codes are dependent on the design.

Result

Creates new InteractionContext and updates previous InteractionContext. Both InteractionContexts are updated with the AgentID touchpoint. The transfer count is maintained across both. Both contain a KVP that references the other's AliasId.

(vii) Template

Get

Every Customer Interaction should be associated with an InteractionContext. A desktop will need to be able to create a form for the creation of each Interaction type: Case, Cart, DPID, Order, Service Tag. The API uses system data to return all Interaction Types and valid Key Value Pairs. This method uses the Agent ID as a Touchpoint.

Only the valid KVPs for the InteractionType of this InteractionConext is returned.

If the InteractionType can be extracted from the DCID (or ContextID), then valid KVPs to the call are returned.

```
Method
    GET     http://fqdn/skynet/1.0/voice/assisted/agentDesk/
        <interactionType>/<aliasId>/template?touchpoint=1111
Input
    {
        "interactionType":"caseNumber",
        "aliasId":" 111-222-333",
        "touchpoint":"AgentID"
    }
    Output
    {
    "statusCode": "",
    "Description": "",
    "data": {
        "key1":"value1",
        "key2":"value2",
        "key3":"value3"
        }
    }
```

Status Codes are dependent on the design.

Result

The touchpoint is updated with the Agent ID and the correct Service Types and KVPs are returned.

(viii) Interaction Type

When an agent interacts with a customer, they should be working on a pre-existing interaction or open a new one. All customer interactions should equate to an InteractionContext. The Skynet-Snap-In uses the Agent ID as the Touchpoint.

An interaction Type can be:
Case
Cart
DPID
Order
Get

Will return the corresponding InteractionContext of this Interaction Type.

---

Method
    http://fqdn/skynet/1.0/voice/assisted/agentDesk/<interactionType>/
        <aliasId>
Input
{
    "interactiontype":"caseNumber",
    "aliasId":" 111-222-333",
    "touchpoint":"AgentID"
}
Output
    KVPs associated with the Context:
{
    "key1":"value1",
    "key2":"value2",
    "key3":"value3"
}

---

Status Codes are dependent on the design.
Result
The Touchpoint is updated and a corresponding ContextInteraction, if it exists, will be returned.

Post

Every Call that is worked on by an agent should result in an InteractionContext being created or updated with the AgentId as the TouchPoint. This API uses the Context Store Upsert method to either create or update the context with matching DCID. This method updates the ContactMethodContext with the DCID of the InteractionContext. If a new InteractionContext is being created, then it calls the local generate DCID to return a new unique UCID.

---

Method
    http://fqdn/skynet/1.0/voice/assisted/agentDesk/<interactionType>/
        <alias>
Input
{
    "interactiontype":"caseNumber",
    "aliasId":" 111-222-333",
    "touchpoint":"AgentID"
}
Output
{
    "description":"success",
    "code":"200"
}

---

Error Code is dependent on the design.
Result
The InteractionContext will be either created or updated with new information supplied from the Agent. The ContactMethodContext and the InteractionContext will be updated to represent a link so IVR can recognise if this is a return customer.

d. Validation API

For each Interaction_ID type (ServiceTag, Order, Case, etc) there is a standardized set of KVPs that will be allowed. That standardized set of KVPs is managed by the API_ID. Each time a KVPs is added or updated it is to be compared to the KVPs of the appropriate API_ID to ensure a KVP that isn't allowed or the length of the value doesn't exceed the standard length. If either condition is true then Skynet should reject the post of context.

(i) ServiceTag Interaction Type KVPs
    CustomerName
    ContactName
    Product
    CustomerPhoneNumber
    PreferredLangValue
    InteractionType
    ContactMethodID
    ServiceTag
    TransferCount
    TransferReason (ii) KVP Length Validation
    Key→must be less than 30 Characters in length
    Value→must be less than 214 Characters in length (iii) API_ID The API_ID Context is used to store data that is key to configuring the standardized operation of applications. The Schema is described as:

ContextId: Captures the unique identifier used by the application.
    GroupId: All API_ID contexts in the grid, should share a common unique group identifier.
    Touchpoints: Captures all the various actors using the context in a list.
    Data: These KVPs will be used to validate operations on other contexts by applications.
        The format of the KVPs stored in the data field is as follows:
            Key=<KEY NAME>, Value=<JSON regex, tooltip, validation, status>.
        The status field of the KVP indicates if the Key is still active, or if it has been deprecated.
        Because the KVPs will be used by a data warehouse reporting suite, they cannot be deleted.
    PersistTo: Database table in EDM (External Data Mart)

e. Other APIs (i) DCN Report

Customer Hub is the System of Record (SOR) for the Dell Customer Number (DCN). This contains all ECID or Party IDs (PIDs) that will link any customer to their respective Channel. This system is currently consolidating data from several systems to fully complete this matrix of customer information. Currently Context Store (CS) has a growing record of DCN to ANI mappings.

It may also contain additional channel mappings. An API can be provided that would return all DCN information that is contained in the CS real-time cache and EDM that could be used to create a Bulk upload that would help populate the SOR for DCN.

Get

Calling this method would return all DCNs and their corresponding ANIs that are in CS.

Method
    http://Fqdn/skynet/1.0 voice/unassisted/dcn (ii) Live Monitoring

LVR agents triage incoming Contact Center calls to supplement any missing data. The Skynet API wraps the CS client event monitoring feature to all LVR agents to monitor for return customers that are missing Service Tags or for high value customers that require elevated treatment.

Post

An LVR agent could post their ID and a list of DCNs they are interested in along with the endpoint to return the asynchronous events to.

```
Method
    http://fqdn/skynet/1.0/voice/assisted/lvr
Input
{
    "lvrId":"lvr ID",
    "dcn":["dcn1", "dcn2"],
    "endpoint":"endpoint url"
}
```

4. High Availability a. Node Failure

Figure 9:
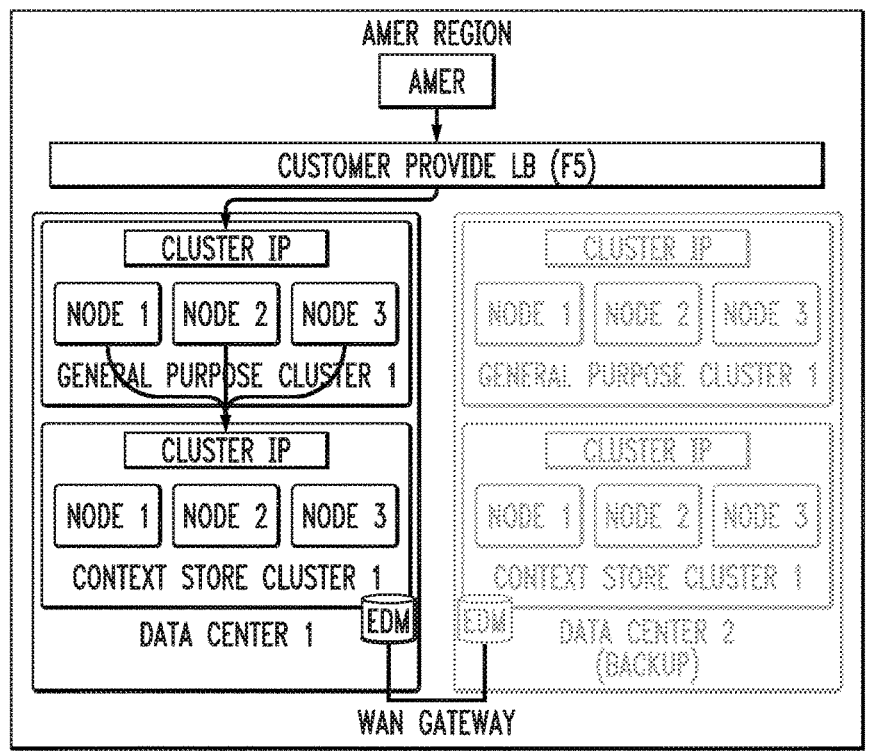
Figure 10:
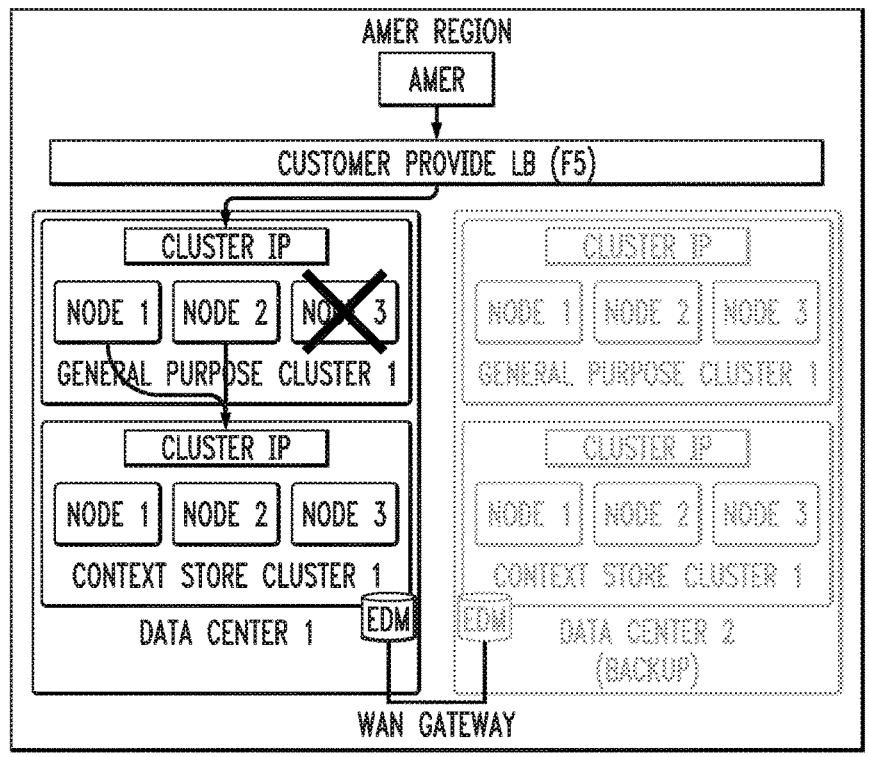

In this implementation, each Region has two Data Centers as shown in architecture 900 in FIG. 9. Each Data Center has two clusters (e.g., Oceana). These clusters contain the Skynet and Context Store Snap-Ins. Skynet Snap-In abstracts the local contact centers from the Context Store by providing a normalized API specialized for a given set of applications. Applications access the Skynet application through the Customer Provided Load Balancer which provides a fully qualified domain name (FQDN). The Skynet application accesses Context Store through the Context Stores Cluster IP.

The Skynet Snap-In consists of three nodes. If one of these nodes fail, as depicted in architecture 1000 in FIG. 10, then the remaining two nodes should be able to continue without any interruption to service or session. The failed node should automatically recover.

Figure 11:
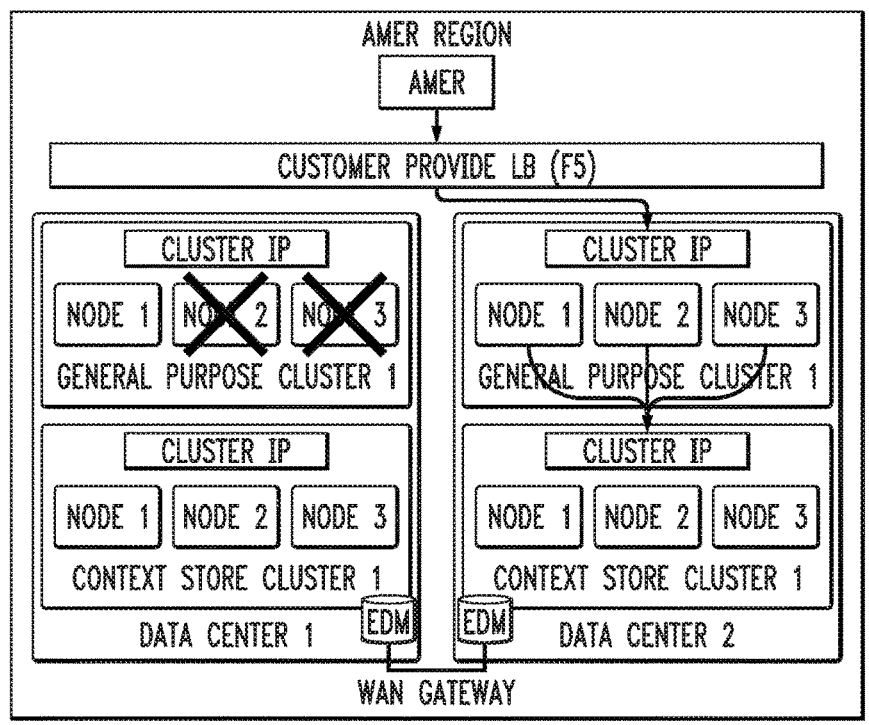
Figure 12:
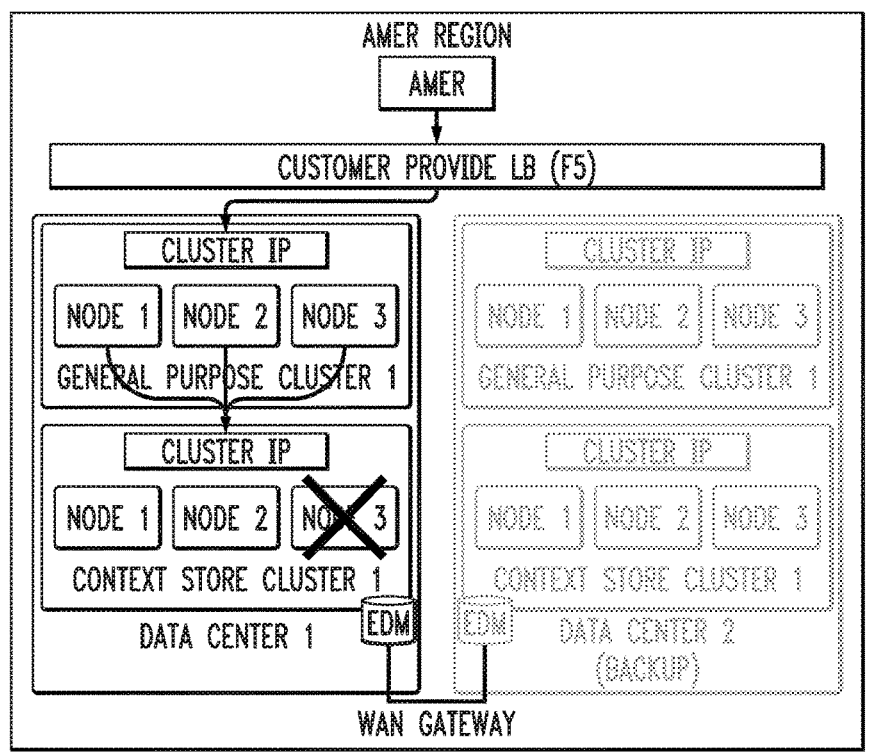

If two if these nodes should fail at any one time, as depicted in architecture 1100 in FIG. 11, then the Skynet Cluster for that Data Center should be considered failed and should trigger the Customer Provided Load Balancer to failover to the backup Skynet cluster. The Context Store can remain operational on both Data Center's but Skynet directs all new services and existing sessions to the Context Store it is co-resident with.

Note that during the failover and the detection, there is a possibility that the WAN Gateway has not fully synchronized in the window. WAN Gateway will merge data but if the same KVP has been updated from both data centers during the fail-over window then there may be a merge conflict.

The Context Store Snap-In consists of three nodes. If one of these nodes fail, as depicted in architecture 1200 in FIG. 12, then the remaining two nodes should be able to continue without any interruption to service or session. The failed node should automatically recover.

Figure 13:
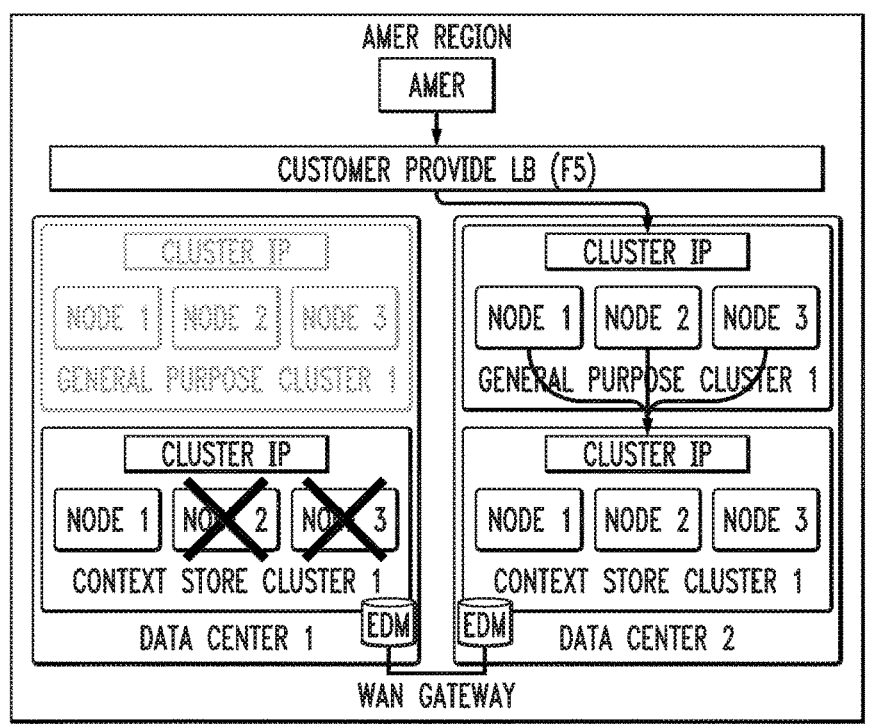

If two nodes fail in a Context Store, as depicted in architecture 1300 in FIG. 13, then it is considered failed and needs to move over to the backup Data Centre. Skynet needs to detect the failure and disable itself so that the Customer Provider Load Balancer can failover.

b. Screen Pop

Context Store has a simplified uniform resource locator (URL) based API. The URLs are designed to be easily integrated into other applications, for example, Avaya One-X Agent. Once this API is invoked though the URL, the API can execute a rule, perform a redirect or possibly return a reformatted output.

The Skynet Snap-In works in tangent with this Screen Pop API. If either the Skynet or Context Store clusters are considered failed on a data center, then it is the responsibility of the Skynet. The SkyNet Snap-In could mimic this functionality but this would mean it would need to be in lock-step with the Screen-Pop function for future releases. To avoid duplication and synchronization issues, Context Store clients continue to use Screen-Pop use cases, but clients use the SkyNet API for all other create, read, update, delete (CRUD) operations.

Skynet Snap-In disables the Screen Pop Snap-In on the original Data Center to ensure that all other Screen Pop clients are directing towards the newly active Data Center.

5. Capacity

Milliseconds matter, subject to testing the Skynet Snap-in should match the tolerances that Contact Store REST supports, i.e., on average each operation should take no more than 25 milliseconds (ms) and no operation should take longer than 250 ms. Skynet will be calling the Context Store REST interface meaning it will be influenced by the LAN latency and CS REST call latency. Some of the Skynet API call's names SBC, IVR, Ringing are in the real-time path and have to be sensitive to introducing additional latency.

Context Store will throttle requests to avoid the In-Memory Data Grid being overloaded, the Skynet Snap-in should work in a manner consistent with the CS throttling.

6. Scale

Context Store is engineered to a fixed size, the Skynet Snap-in's scale needs to support Context Store requirements. Application capacity engineering will need to be completed to determine the node size that needs to be deployed.

7. Security

Context Store (CS) supports an authentication and authorization service that controls the users and applications that can access it. Securing CS like this ensures users and/or applications cannot maliciously/accidently change CS indexing and KVPs in a way that could negatively impact business processes. The Skynet Snap-in is the gateway API for all external applications to access the CS. The Skynet Snap-in is granted CRUD control to Context Store, but not other applications with the potential exception of CS Screen Pop will be able to directly access information stored in Context Store.

The Skynet Snap-in creates authentication accounts for:

Skynet development

Skynet production

Screen-Pop development (optional)

8. Serviceability a. Deployment

Skynet supports the ability to deploy multiple versions of the snap-in into the General-Purpose Cluster for testing and evaluation. Each version of the snap-in deployed should support separate and global configuration.

b. Heartbeat

Skynet may periodically (e.g., one second) call Context Store REST interface to verify that the connection is alive and healthy. The diagnostic check can be used to share the current state (where applicable) between applications, such as installing/uninstalling/ready/throttled etc.

c. Logging

Skynet is configured to log at INFO level logging and logging is at sufficient level to allow for standard API calls to be debugged without the need to increase logs to DEBUG level. Info level logging should log the entrance into a method including the parameters passed. Logging should be consistent with PCI and PIII compliance and not persist to file any customer sensitive data, i.e., credit card details. In one example, every log statement resulting from a REST API invocation include:

Skynet API called
DCID
Touchpoint

Logging methods are compatible with Open Source logging technologies such as Splunk, Kabanna or Logstash. Logging sufficiently correlates information to allow an engineer to easily trace the interactions of a call as it is passed through Call Center.

A sample INFO level log statement is:

{TIMESTAMP}:{DEVICE_ID}:{DCID}:{API}:{Touchpoint}{Query Parameters}{Body}{Message}

DEBUG level logging records the entry and exit of an API call and any major decision points or callouts that may have happened in the Skynet method. Logging level is able to be changed dynamically during run-time.
(i) Environment Logging Skynet logs all lifecycle events for the Skynet Snap-In and the individual instances, i.e., start-up, shut down, deployment. If Skynet introduces throttling on the REST interfaces, then it logs the low and high water-marks when throttling is invoked. For throttling, an alert should also be raised when the high water-mark is passed and cleared when it returns below low water-mark.
(ii) Storage The system is configured such that 30 days of logs at max capacity can be maintained before being overwritten. Context Store is to support 25 cps, which all come through Skynet. If each call produces one log entry then it will produce roughly 25k every second. This equates to about 2.16 gb every day and hence about 60 gb every month.

((25 cps*1K)*(60*60*24)*30)/1000=64 gb

Sample data entry plus some contingency [01/Feb/1998: 01:08:39-0800] 111.222.333.123 Instance1-GET/skynet/1.1/1111 TP[IVR] QP[serviceType=order] BODY[key1:value1, key2:value2,key1:value1, key1:value1, key1:value1, key1:value1] "Entered at xyz"
(iii) Performance As Skynet is in the path of real-time applications, such as IVR, consideration is made to minimize impact to its performance and hence a compromise on the amount of logging performed can be made.
9. Contact ID The Skynet Snap-in provides a means to generate a universally unique identifier (UUID). This UUID is referred to as the Dell Contact Identifier (DCID) in this implementation and is also generated by the Session Border Controller (SBC) for voice calls. The DCID is used as a {Contextid} of the interaction Id, and as a {touchpoint} in the Contact Method Id.

The Schema of the DCID varies from application to application and will be defined in API_ID contexts within context store. Applications will need to collect the relevant schema data to generate an accurate DCID. The uniqueness of the DCID is ensured between the various applications by capturing the Media and Platform Type. This DCID offers the Snap-in a simple mechanism to pass Contexts along with the voice call so the applications can do a single lookup based on call variables. Capturing the Interaction Type across the 4th and 5th Digits of the DCID, applications other will also be able to classify contexts without retrieving the context from the data-grid. FIG. 14 illustrates tabular example 1400 for an Agent Desktop application.

The Skynet Snap-in supplies an interface to the internal methods to allow them to create a DCID. This ID is unique across Context Stores on Data Centers and unique when stored against historical records.
a. GET Skynet supplies a REST command that returns a unique generated DCID.

Method
http://fqdn/skynet/dcid
Input
None
Output
{
"dcid":"9110112345679999"
}

10. Configuration and Administration

Context Store contains the configuration information that the Skynet Snap-In uses to execute. This configuration information includes operational information such as leases and timeouts as well as reference information used for validation.

As depicted in architecture 1500 in FIG. 15, Skynet loads information from EDM into the Context Store that has the 'PersistTo=PROVISION' flag when the Snap-In is installed. This 'PersistTo' will ensure that the information is stored and remains synchronized with the EDM database. Skynet supplies a REST API that allows users to view this context data.
a. Reference Information The following is a list of allowed Key Value Pairs in the system. These KVPs are used as part of the customer discovery, storing contact information, used to lookup external data or a provisioned data for future use. Any REST method that is modifying or updating KVPs checks to see if the KVPs are valid or is it going to modify a process critical KVP.
(i) Customer Experience Enhancers:
  Diagnostic Link
  Chat Transcript Link
  Company Number
  Authentication
  Sales Prospect Type
    Suspect
    Prospect
    Existing Customer
  Campaign Id
(ii) Customer Journey Markers
  None of these KVPs should be modified by any Context Store application other that Skynet. These KVPs are essential to the operation of Skynet and incorrectly modifying them could cause issues with the performance of the system:
  Language
  Segmentation_Rule (Segmentation_Table+Rule)
  Transfer Reason
  Transfer Count
  SMS Direction
    IN
    OUT
  AliasId
  Contact Date
  CONTACTMETHOD_ID
    Ani
    email
  Query Type
    Sales/Care/Support/DFS Interaction Type Id
  identifier
Interaction Type
  Express Service Code/Service Tag/Case Number/Account Number.
Inherited ID
  The ID of the parent or child associated interaction ID.
  DFS Specific:
Non-Delinquent Accounts
  DFS account number
    13 digits or 15 digits for Lease Account Number
    19 digits for Revolving Credit Account Number
  Account Type
    Cust # or DPA #
  Transfer Type
    CT, FT, HT
  IVR Last State
    Additional Options
      Delinquent Accounts
  DFS account number
    13 digit or 15 digit for Lease Account Number
    19 digit for Revolving Credit Account Number
  Account Type
    Cust # or DPA #
  Transfer Type
    CT, FT, HT
  IVR Last State
    Additional Options
  Collections agency assignment
    3 digit code (example: ARA)

b. Configuration Information

Skynet configuration information can be updated through SMGR. Skynet supports the dynamic refresh of this configuration information at run time.

| Data | Default | Description |
| --- | --- | --- |
| Default_Lease | 604800 | This value can be configured at the context store or can be a default Skynet variable that can be passed in with each operation |
| Context Store FQDN | {blank} | The complete domain name for a Context store cluster loadbalancer |
| List Count | 1 | The default number of interaction ids to be returned from a contact method id's touchpoint list when queried by IVR. |
| Alarming thresholds | TBD | The snap-in is configured with operational threshold limits. | c. Customer Information

In this implementation, Context Store is configured to handle being provisioned with 50K ContactMethod contexts. This data seeds the system with the most valued customer data. Once loaded in CS, this data can be maintained using the regular Context Store interfaces.
A sample of the ContactMethod Context is:

```
{
    "contextId":"<<ANI or Email>>",
    "Touchpoint":"<<DCID>>",
    "Data": {
        <<DCN>>:<<Timestamp>>,
    }
}
``` d. Status Codes
The following is a list of standard error codes:
200—OK
Everything is working
201—CREATED
New resource has been created
204—NO CONTENT
The resource was successfully deleted, no response body
304—NOT MODIFIED
The date returned is cached data (data has not changed)
400—BAD REQUEST
The request was invalid or cannot be served.
The exact error should be explained in the error payload. e.g. "The JSON is not valid".
401—UNATHORIZED
The request requires user authentication.
403—FORBIDDEN
The server understood the request, but is refusing it or the access is not allowed.
404—NOT FOUND
There is no resource behind the URI.
500—INTERNAL SERVER ERROR
API developers should avoid this error. If an error occurs in the global catch blog, the stack trace should be logged and not returned as response.

B. Context Data Management

1. Architecture Specifications

In this exemplary implementation, business and other applications hosted on an application development and deployment platform (e.g. Avaya Breeze from Avaya Inc., Santa Clara, Calif.) share the same hardware, products and support to facilitate re-use of the existing context data-grid.

a. Context Object

A context, as illustratively used in this implementation, is a collection of key value pairs (KVPs) that are associated with unique identifiers and is stored for a specified duration in an in-memory grid. These identifiers are unique to a Context Geo-Cluster for only the time they are in memory, ideally the values used should be unique for all time. FIG. 16 illustrates the concept of a context object 1600 according to one embodiment.

When building a context there are several factors to be considered:

1. What to store in KVPs and why—Context Store (CS) is not necessarily a 'drop box' for all data and only should be used to store information that is needed by time sensitive processes, i.e., routing, screen pop. CS is also used to store important information that may be lost when a current customer interaction ends but a subsequent interaction is anticipated to start soon.
2. Size—CS is an in-memory distributed data-grid with limited resources for the storage of data. A capacity planning tool can be used to calculate the size of potential KVPs and the max number that can be created before the capacity of the data-grid is reached.
3. Expiry—Contexts can be configured to expire after a given lease. Storing Contexts for longer reduces the total number of contexts that can be stored. The capacity planning tool can be used to assist in these calculations.
4. Look-Up—The CS supports several different indexing methods. Indexing is important as some applications are not able to cache or retrieve a ContextId and hence need to be able to access the context using their own correlation identifier.
5. Immutable—If data is important, i.e., used for routing or to enforce business rules, then it is important that it does not get overwritten.
6. Persist—Operations on Contexts can be persisted to an External Data Mart (EDM) to analytics and reporting and to populate the data-grid with previous Contexts on request or provisioning on a re-deployment of the cluster.

7. Type—While the Schema of a Context is fixed, this exemplary implementation has categorized three types of Contexts to exist in the data-grid: a CONTACT_METHOD_ID, an INTERACTION_ID and a API_ID Context, as are further explained herein.
8. Role—Contexts can serve various roles within a solution: profiling, routing, reporting, session tracking. It is therefore important to ensure that only data applicable to the role is including in its KVPs.
9. Source/Dependent—Contexts are shared by a wide range of actors (e.g., applications and users). It is important that the data required to route information to dependent actors is available.

(i) Structure

The structure of the context object is fixed. The capacity planning performed as part of the exemplary implementation has introduced additional tolerances, or size constraints, to those outlined by Context Store regarding the structure of the context object. To ensure that the in-memory data-grid in this exemplary implementation can support the necessary performance requirements of the contact center, these size constraints adhered to:

ContextId→less than 25 Characters in length
Data→Maximum number of 15 Key-Value Pairs (KVPs)
  Key→less than 30 Characters in length
  Value→less than 214 Characters in length
Lease→maximum duration of 7 days (ii) Identifiers

UUID

Different contact flows can cause the call to be associated with a Context that has a different universal contact identifier or Dell Contact Identifier (DCID). A universally unique identifier (UUID) such as the DCID offers us a simple mechanism to pass this ContextId along with the voice call so Desktop can do a single lookup based on call variables.

Also, by using the DCID to pass the ContextId, it creates a link in the reporting database that can be used to link these different call ids.

The DCID is automatically generated by the Session Border Controller (SBC) for voice calls. Applications that create INTERACTION_ID contexts also have the functionality to create a new DCID to assign to the Context.

An alternative implementation creates a pseudo LinkedList where the external ContextId is added as a KVP on a context with the call DCID. The external Context is retrieved by doing two lookups, one to get the Context with the call DCID and another lookup that uses this ContextId to retrieve the correct context.

Contact Channel

Customers can interact with the Contact Center using many different channels at their disposal such as ANI, Email, Chat, etc. Each of these channels has an address that identifies the customer at this channel and this is known as the Contact Channel. A Contact Channel can be unique to an individual or can be shared across multiple individuals, i.e., home sharing the same phone (ANI), office sharing the same phone (ANI). Therefore, Contact channel alone is not always a reliable means of uniquely identifying an individual. A CONTACT_METHOD_ID context is created to help link a contact channel to an individual. Common Contact Channels are: ANI—e.g., home phone, office phone, cell; Chat; Email; Social—e.g., Twitter, Facebook; and SMS.

Customer Number

The Customer Hub provides a Dell Customer Number (DCN) that can be used to uniquely identify a customer. Each DCN is associated with a single E-Channel identifier (ECID). ECID is known as Party Id and Keyring Id. Each customer will be identified by the ECID, retrieved using any of the customers personal information including their contact method, based on information recovered from the Dell systems of record.

DCN is continually improving, updating its records to reliably link Contact Types to DCN but these records are not fully updated and the proposal is to use the CONTACT_METHOD_ID Context to link DCN and Contact Channel.

Interaction Type

The Dell Contact Center services multiple types of queries that relate to the various lines of business. Customer interactions with the Contact Center are categorized by query types. For example, these categories are Support, Sales, Care, DFS. The Interaction Type is stored as an AliasId in the INTERACTION_ID Context as it is an indexed field, allowing for customer interaction to be retrieved by the various query types.

Support

A customer, identified by a DCN, can have several ongoing Support queries at any given time.

Service Tag/Express Service Code
  The Dell Service Tag (alphanumeric) or Express Service Code (Numeric) are interchangeable identifiers. Dell uses these product identifiers to access information about a device's specific tech specs and warranty. They can have multiple associated Cases open against it.

Case Number/Service Request
  A Case Number or Service Request is created to references a service call. They are unique identifiers.

Sales

A prospective customer can be associated with several ongoing Sales queries at any given time.

Cart Number
  The Cart Number is used to reference a customer's shopping cart. Cart Numbers can have multiple associated orders produced from it.

Quote Number
  The Quote Number is used to reference a prospective customer's sale quote.

Dell Purchase Identifier
  A Dell Purchase Identifier (DPID) is generated from the successful conversion of a cart to one or many orders. It can have multiple associated order numbers tied to it.

Order Number
  A Purchase can produce multiple orders, each assigned a unique Order Number identifier.

Care

A customer can also be associated with several ongoing Care queries at any given time. These relate to existing queries created previously through Sales or Support queries.

Dell Financial Services (DFS)

DFS uses an account number to manage queries made by the customer.

Account Number
  The DFS account number is 13 digits or 15 digits for a Lease Account Number and 19 digits for a Revolving Credit Account Number.

(iii) Schema

The context management of customer journey information requires data to be stored across multiple types of contexts to facilitate various use cases.

The CONTACT_METHOD_ID and INTERACTION_ID contexts are the result of these use cases. The API_ID is used to validate operations on these contexts by various applications.

The Context Schemas that structure the necessary data are as follows:

CONTACT_METHOD_ID

The CONTACT_METHOD_ID context is used to map the Contact method to the various DCNs that may use that channel. The Schema is described as:

ContextId: Identifies the customer by channel or contact method. Examples include ANI, Email, Social Media handle.

Touchpoint: Contains the list of Dell Contact Identifier (DCID) that queried the Contact Method.

Data: Lists the associated DCNs of the contact Method.
  Size limitations permit a maximum of 15 DCNs per contact method.
  Each KVP is formatted to include the timestamp of an interaction.
    This facilitates querying the Context for the most recently used DCN.

Figure 17:
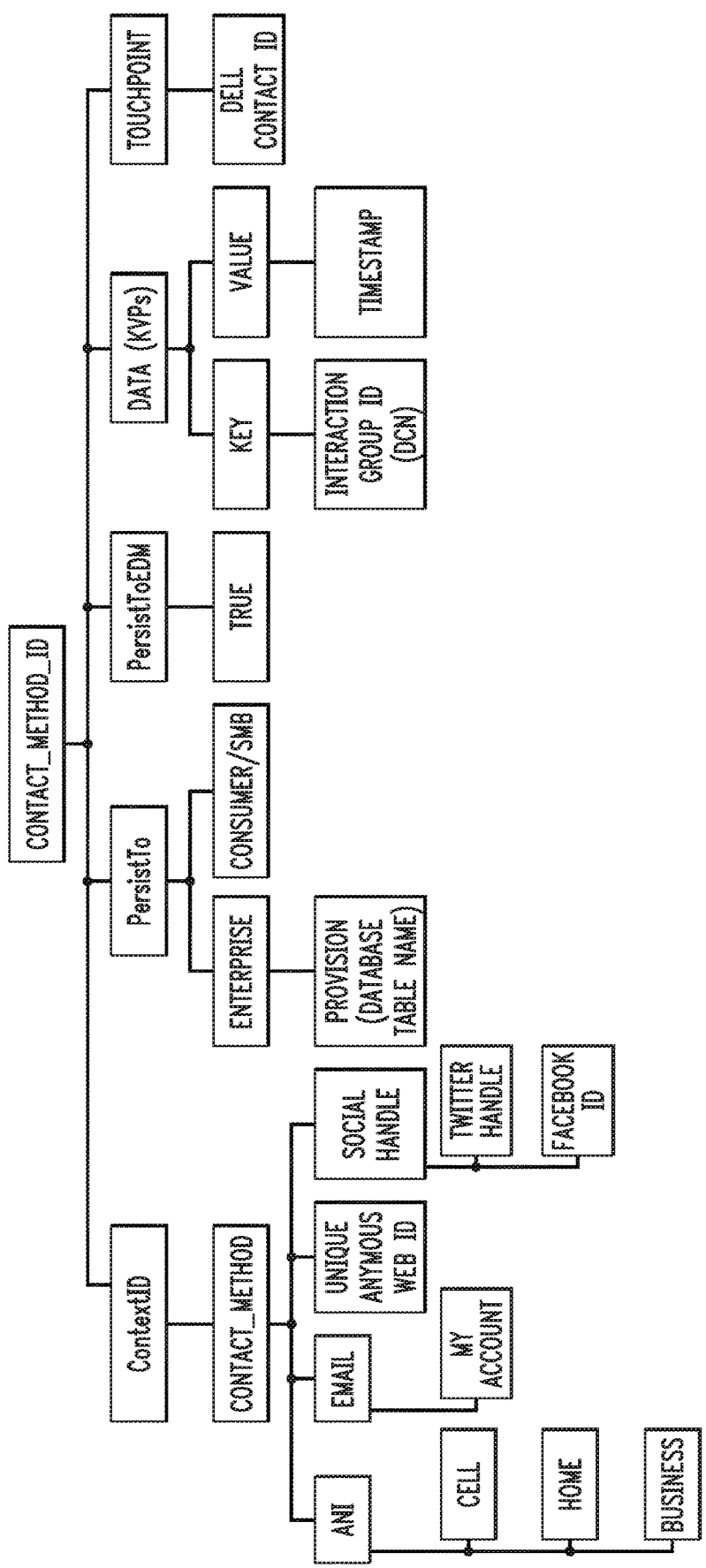

An example CONTACT_METHOD_ID schema 1700 is illustrated in FIG. 17.

API_ID

The API_ID Context is used to store data that is key to configuring the standardized operation of applications. The Schema is described as:

ContextId: Captures the unique identifier used by the application.

GroupId: All API_ID contexts in the grid, should share a common unique group identifier.

Touchpoints: Captures all the various actors using the context in a list.

Data: These KVPs will be used to validate operations on other contexts by Dell applications in the transformation project.
  The format of the KVPs stored in the data field is as follows:
    Key=<KEY NAME>, Value=<JSON regex, tooltip, validation, status>.
  The status field of the KVP indicates if the Key is still active, or if it has been deprecated.
    Because the KVPs will be used by the data warehouse reporting suite, they cannot be deleted.

PersistTo: Database table in EDM (External Data Mart).

Figure 18:
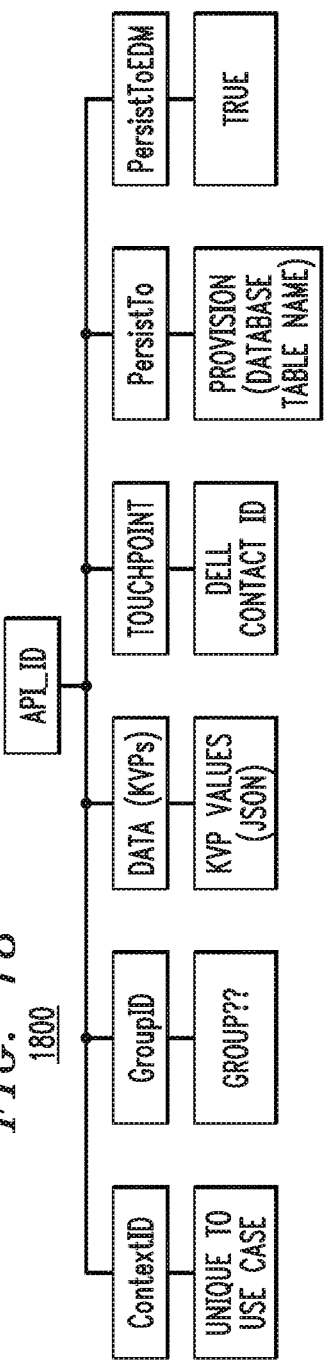

An example API_ID schema 1800 is illustrated in FIG. 18.

INTERACTION_ID

The INTERACTION_ID Context tracks the interactions of the various actors (applications and users) across the customer's journey. The Schema is described as:

ContextId: Captures the initial DCID.

AliasId: stores the Interaction Type Id associated with the interactions.

GroupId: The connected DCN, where applicable.

Data: Information considered relevant to satisfying the journey is stored as a KVP.

Touchpoints: The identities of the actors using the context are stored in this list.

Figure 19:
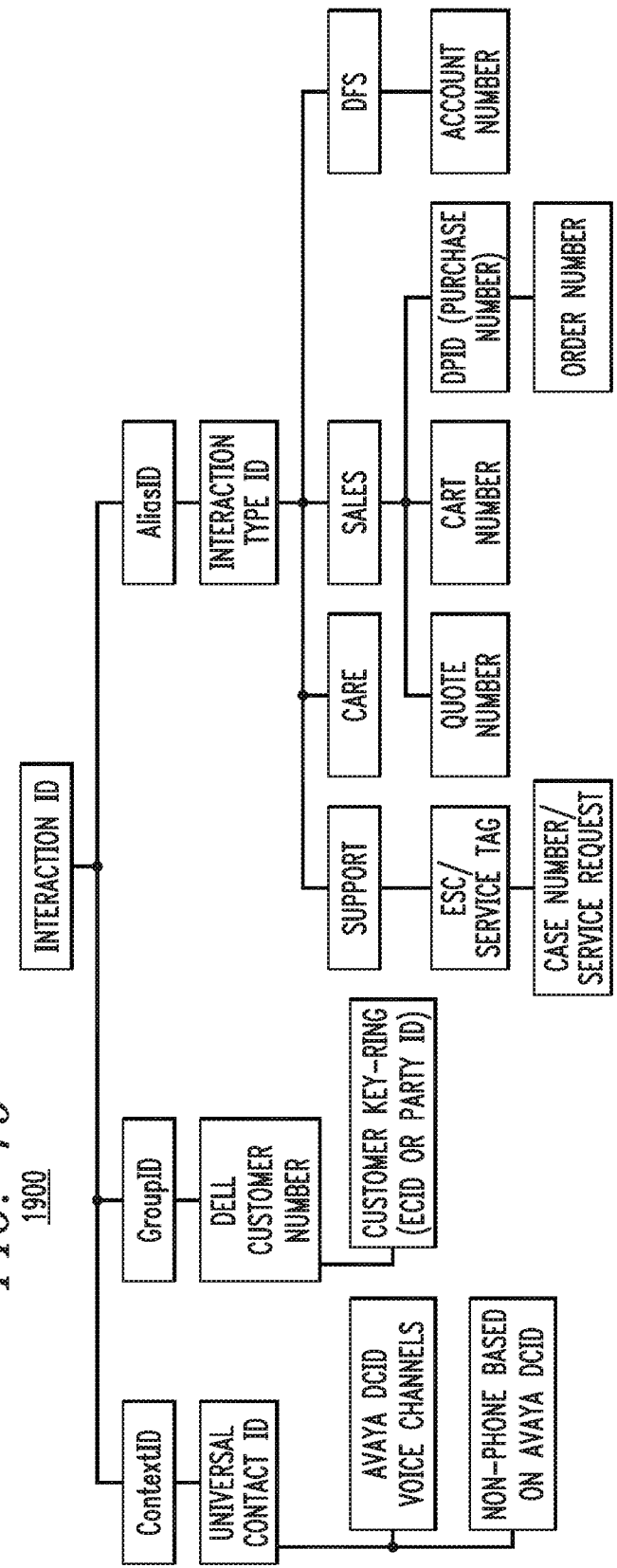
Figure 20:
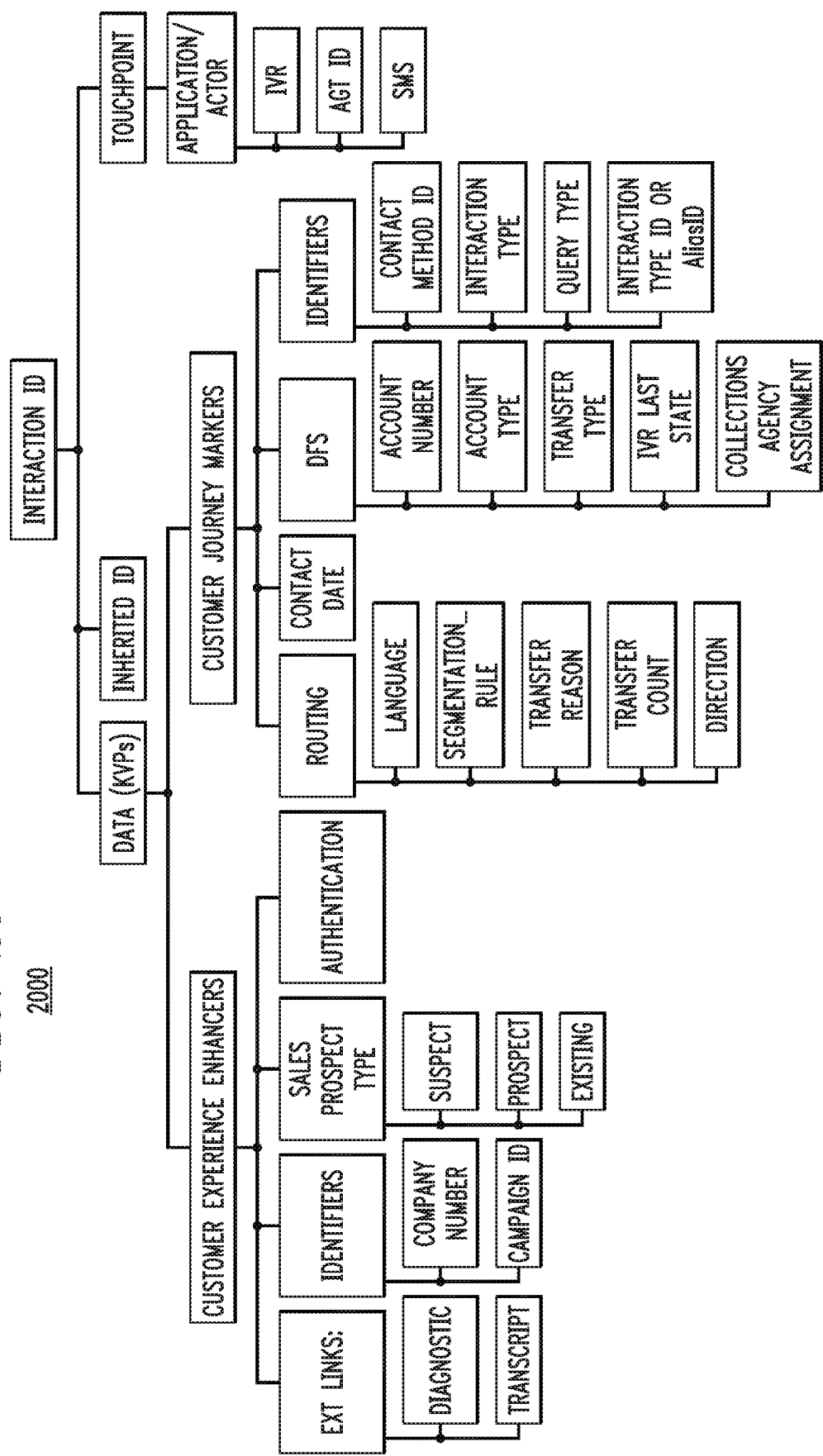

An example INTERACTION_ID schema 1900 (part 1) is illustrated in FIG. 19 and an example INTERACTION_ID schema 2000 (part 2) is illustrated in FIG. 20.

(iv) Lease

The current capacity planning of the data-grid supports a default lease for context data is seven days, with the exception being the CONTACT_METHOD_ID and API_ID data identified to be core to the business strategy, which are assigned an infinite lease.

Should the throughput on the data-grid exceed the value planned, or the requirements on the data-grid change the lease should be expected to be reduced accordingly.

(v) Indices

Context objects can be queried from the data-grid by a ContextId or by an associated correlation Id such as the AliasId or GroupId.

Context Id

This is a text field that contains a unique identification for the context. The ContextId is specified while adding the context to the data-grid. If a ContextId is not specified while creating a context, the system generates a unique id. The following are used as the ContextId for the respective contexts:

The channel address is used as the ContextId of the CONTACT_METHOD_ID.

The Universal Contact Id or the Customer's INTERACTION_ID is stored as the ContextId of the INTERACTION_ID.

The Query Type is assigned as the contextId of the API_ID, corresponding to the key string used to reference query type from INTERACTION_D KVPs.

Correlation Ids

Alias Id

This field contains additional unique identifications or the aliases associated with a Context object. The maximum number of AliasIds supported is one. It can be specified while adding the context entry in the data-grid or updating an existing context entry.

The valid query types used by the Contact Center such as ServiceTag, DPID, Case, Cart or Order numbers are to be assigned to the AliasId field of the INTERACTION_ID. This allows applications to return the specific INTERACTION_ID generated with a previously generated Universal Contact Id.

Group Id

This is an optional text field that creates a logical group of related context entries. The GroupId can be specified while adding the context entry in the data-grid or while updating an existing context entry.

DCN is assigned to the GroupId of the INTERACTION_IDs. This allows the system to return all existing INTERACTION_IDs that belong to a given customer.

All API_IDs share a custom GroupId to return all contexts in the data-grid that provide validation look-up functionality to sequence web applications.

(v) Data (KVPs)

The data field in a context entry is an abstract map with multiple key/value pairs. The Keys in the data field must be unique. It does not support lookup and must be retrieved in its entirety.

The KVPs contained within the CONTACT_METHOD_ID reference the DCN associated with the contact address stored in the ContextId. These DCNs correlate contact address to the GroupId of the various INTERACTION_IDs that exist in the data-grid. DCN can be replaced by ECID or party Id, removing the need for the CONTACT_METHOD_ID context.

The INTERACTION_ID stores a diverse selection of KVPs to support the various use cases of the Contact Center. Only information that is required by dependent users should be added as a KVP. This refers to information required to process requests from customer to agent, agent to agent, between channels or applications.

A main driver of ensuring performance is the maximum number of KVPs. The amount of KVPs and their max size are key factors in sizing the real-time memory data-grid.

Information to be excluded is data that is readily available to the application or user without querying contextual data. An example of this is routing information such as DR3 dimension data. Personal Identification Information (PII) should not be stored as KVPs either because the Context object is not encrypted.

It is also to be noted that where data is stored as a Systems of Record (SoR), but is not readily available to the application or user, a KVP is used to pass the external link to the data.

(vi) Metadata

The Touchpoint parameter is an alphanumeric ID. Touchpoints are used to track the type of interaction and churn on the context.

(vii) Context Size

The context object can be sized, in one example, via the capacity planning on the in-memory data-grid, to support 3 aliases, 50 Touchpoints and 15 KVPs. Additional constraints of character size identifiers can also be introduced on the context, to facilitate accurate capacity planning.

(viii) Context lifecycle

Each INTERACTION_ID is written to the data-grid with an initial lease of 7 days. Each time the context is queried or updated, the lease of both the INTERACTION_ID and the associated CONTACT_METHOD_ID context will be renewed.

All API_IDs and any CONTACT_METHOD_ID that is associated with an enterprise customer has an infinite lease, not requiring renewal, and thus available in the data-grid permanently.

Once a Context has expired, its details exist in an on-disk database (EDM) for approximately 80 days with the current deployment configuration. During this time, the context can still be queried and be returned to data-grid if required. After this allotted time, the data is migrated to a larger on-disk database used for reporting and analytics. The capacity planning in this example provides for 50,000 provision-able contexts.

(ix) Exemplary Best Practices

- Session Manager (ASM) applications should not perform read or multiple queries of contexts, to minimize latencies on the system.
- Applications should use the Java Native API to interact with the Context Store.
- Applications must correlate data throughout the session.
  - The customer should not be repeatedly interrogated for the same data.
- Agents will know where the customer came from.
- Only the information that is required to process the request by other dependent resources in the journey should be added as an INTERACTION_ID KVP.

b. Cluster

Figure 21:
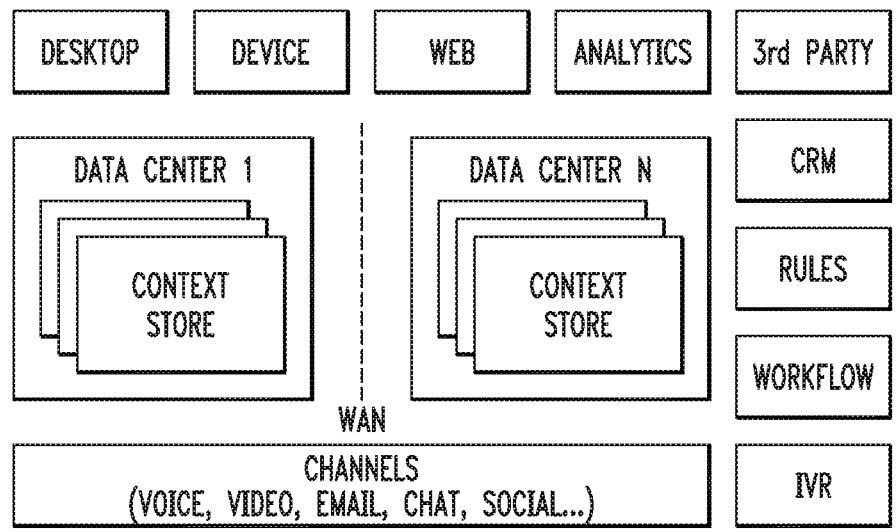

Context Store is deployed in a three node cluster pair, sized at 64 GB and four CPU Cores per node in an exemplary implementation. FIG. 21 depicts one example cluster deployment 2100.

(i) Capacity Planning

The data-grid cluster design in one example is based on the busiest hour call volume for with added room for scale, e.g., a total of 8,830 calls were received during the busiest hour across a given set of data centers.

(ii) API

The data-grid supports a variety of APIs to interact with the data stored both with the data-grid and EDM.

Applications reference the API_ID for the valid Keys that it can add to their respective INTERACTION_IDs.

Rest

Context Store implements a RESTful web services interface to provide the required services to clients.

The interface focuses on system resources, including addressing and transferring of resource states. It identifies the resources using HTTP URLs and returns the output to the clients using JavaScript Object Notation (JSON).

Using the ContextId, or optionally an AliasId, through the CSRest snap-in service, one can create, read, update and delete context entries and values. One can also group related context entries together by assigning a GroupId when the context entry is created or updating an existing context entry with a GroupId.

Context Store REST interface can also retrieve context data that is unavailable in the data-grid but still exists in the external data mart (EDM).

The interface can be used to collect all associated context data from the EDM in the JSON format. It can generate audit trails or retrieve instances of context data from the context data stored in the associated EDM database. With this collected data, you can visualize a customer journey represented by an interaction with a Touchpoint.

Java

Context Store provides a Java software development kit (SDK) to facilitate the access to the data-grid. The Context Store Java SDK provides a client library for users to write software that will interact with a deployed data-grid. Access to data-grid through the Java SDK requires client authentication established using certificates.

Integration

Context Store provides a JavaScript SDK to facilitate access to the data-grid. The JavaScript SDK provides a client library using which users can write software that interacts with a deployed data-grid through the CSRest interface.

(iii) Optional Components

The Context Store data-grid cluster is supported by a wide selection of optional components to enhance how the context data is utilized.

ScreenPop

Context Store provides screen pop functionality which can be used to either view, add, or update the data stored in the data-grid from a variety of formats. ScreenPop supports the following formats for returning data: HTML, XML, JSON, URL, REDIRECT, WA, and MAILTO.

Real Time Notifications

Context Store provides functionality to receive notifications for any change in a context entry. It creates the notifications in JSON format. One can configure up to five subscriptions to these notifications.

Event Streams

Context Store provides fine-grained and personalized event notifications. Users, such as an agent or agent supervisor, can register for customized event streams. The users can filter these event streams by identifiers of the context, such as ContextId, or specific keys or key/value pairs that the context object contains. However, it does not support filtering event notifications by AliasIds.

c. Functional Requirements

External Storage

Once the EDM database has reached capacity, the oldest data is migrated to larger on-disk database for analytics and reporting to make room for new context data interactions.

The EDM stores all context data interactions for approximately 80 days with the current configuration.

Provisioning

This data is used to seed the data-grid with an initial load of data on start-up. Additionally, provisioned context data during runtime is automatically synchronized with the database.

d. Non-Functional Requirements

Performance

The outlined deployment of Context Store supports 25 requests per second. Each context contains a maximum of one AliasId and 50 Touchpoints. Where possible, Application's use the relevant Systems of Record (SoR) to perform a lookup for routing information.

Latency, execution and concerns of reliability problems introduce a delay or a failure point into the routing flow. To alleviate these concerns, context objects may be used to store certain KVPs in the data-grid. However, these KVPs should only be introduced as a remedy and not as a precaution to a delay or failure point.

Operation

This is used to verify the average latencies on the requests to the cluster. This is also used to verify the state of storage capacity of the grid and EDM when utilizing a 7-day lease.

Additionally, data-rollover from EDM to the larger database, geo-replication from cluster to cluster and latencies of the sequence web applications will all be monitored.

Scalability

The scalability options are as follows:

Scale Out feature: Provides the option to deploy the data-grid on a single-node cluster or on a cluster containing from two nodes up to a maximum of five nodes.

Scale Up feature: Supports incremental memory allocations for application development/deployment platform nodes and provides the option to store data in the grid for longer lease duration.

Data Integrity

The context store data-grid ensures consistency by maintaining data integrity with 100% transactional data handling.

Security

Context Store uses an application development/deployment platform (e.g., Avaya Breeze) to provide security configurations for access to its service using an authorization service. The authorization service provides the following security functions to other snap-ins:

Authentication of end users through lightweight directory access protocol (LDAP) or security assertion markup language (SAML)

Authentication of client applications using public key infrastructure (PKI)

Fine-grained authorization of snap-in features through client application

Client applications may or may not be snap-ins. The term "snap-in" illustratively refers to a software program that is designed to function as a modular component of another software program. Using authorization service, a client application may authenticate the client credentials and optionally with a user credentials. The client is then provided with a token that can be used to securely access multiple snap-ins without being challenged. For example, a context store snap-in leverages authorization service by acting as a resource server. Client applications using context store snap-in first authenticate with authorization service and then provide the token to context store snap-in with a request for validation.

Note that authorizations including whitelist or certificate-based HTTP(S) security mechanisms are supported with the context store snap-in which are administered through ASM.

In-Memory Data

Current business strategy requires the retention of a minimum of 7 days' worth of context data.

Encryption

Context Store enforces secure socket slayer (SSL) encryption on the replication channel between clusters.

Persisted Data

The EDM stores all requests regarding the INTERACTION_ID and CONTEXT_METHOD_ID.

Figure 22:
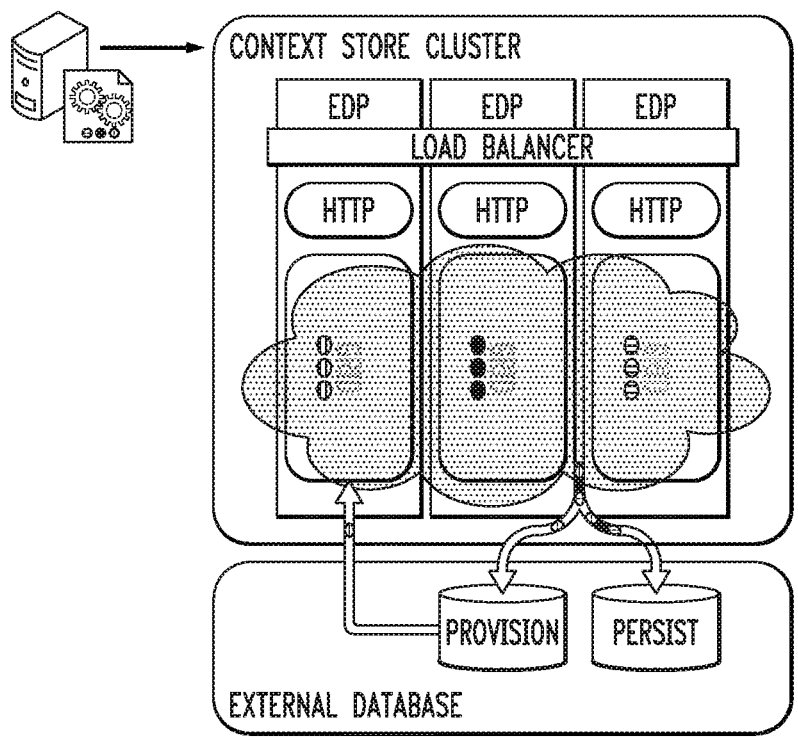

All API_IDs and CONTACT_METHOD_IDs that are associated with enterprise customers are also persisted to an additional provision table of the EDM for pop-up operation on the data-grid. FIG. 22 illustrates EDM persistence 2200.

High Availability and Fault Tolerance

The data-grid is highly available and fault tolerant.

Self-healing: The data-grid has disaster recovery capabilities that minimize the chances of a downtime. It also preserves its state, in case of a system failure it can recover the data-grid in its latest state.

Data partitioning and redundancy: Context Store partitions the data that is present in the data-grid and distributes the data across all machines. The system keeps a backup of data from each partition so that if one source becomes unavailable, the data-grid can retrieve the same data from the backup location. Server failure If any server in the cluster is unavailable, Context Store redirects the client's requests to the available servers in the cluster.

Request Failure

The REST requests are stateless and can be routed to any server in the cluster. If there is a failure processing a request an error code is returned. Should a request fail to be processed, a time-out error occurs and the request must be requeued and sent again.

Data Center

Figure 23:
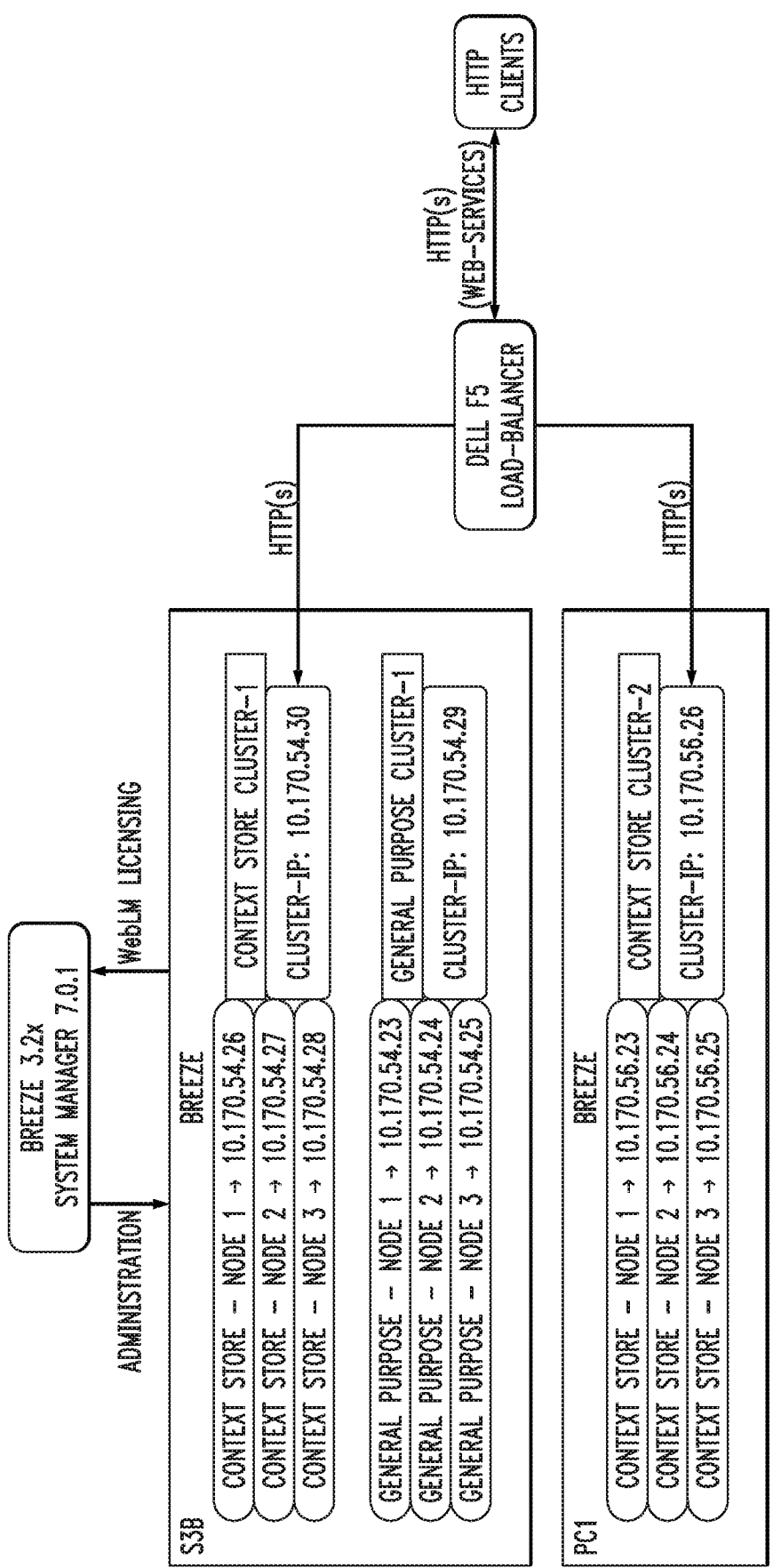

An exemplary data center containing the data-grid is shown in configuration 2300 in FIG. 23.

Geographic Redundancy

Context Store geo-redundancy incorporates bi-directional replication of state and data across the two clusters to ensure preservation of session, in case of a cluster failure. The bidirectional replication strategy stores backup of all contexts in each cluster, so that if a cluster or a datacenter is unavailable, you can continue working with the backed-up context.

The Context Store Clusters is in an Active-Standby pair behind a Dell F5 load balancer. Session is preserved across Data Centers via replication. The primary cluster is in service while the secondary is in high-availability (HA) standby.

2. Exemplary Solution

As mentioned, currently there is no reliable means to connect the customer specific channel addresses such as ANI, Chat, E-Mail, etc., to the customer's DCN within the one context object. To solve this, embodiments create and use a look-up pattern (context data management pattern, as described herein) that creates an associated Context (CONTACT_METHOD_ID) that can be retrieved using the channel address and contains a reference to the DCN.

Subsequent actors (applications or users) in the customer journey retrieve this Context using the channel address and see if the object has a DCN. Using a DCN, the actor can retrieve all Contexts that are associated with this customer using it in a GroupId query.

The actor can then analyze these associated contexts to determine if the customer is returning to the Contact Center to discuss a query: ServiceTag, DPID, Case, Cart or Order Number. The query is stored in a separate context (INTERACTION_ID), used to capture all activity linked directly to the query. It is retrieved via the DCID, DCN or a unique Identifier.

a. Assumptions

The core working assumption to this solution is that the Systems of Record (SoR) used as part of the supported services are always correct. This dependency also extends to the latency on the system to retrieve data is within industry standards and does not impact the customers experience. It also assumes the DCID is available to be queried and used as an identifier within each INTERACTION_ID context operation.

b. Pattern

When a customer calls a Contact Center, they cannot always be readily identified by their Contact Type. Several Contexts are created in Context Store to help correlate the correct Contact Type to the customer call intent be it sales, support, finance, etc.

Figure 24:
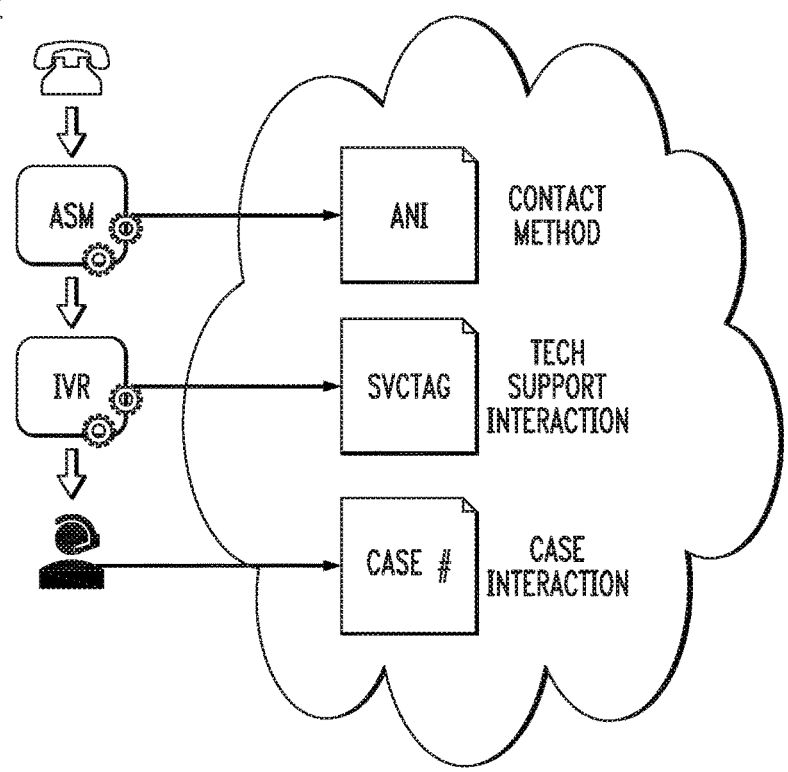

A context data management pattern scenario 2400 is depicted in FIG. 24.

Sequenced web applications, to be deployed within an Avaya Session Manager (ASM), create/update a CONTACT_METHOD_ID Context using UPSERT to support low-latency and high throughput. It captures all available information in this context, the channel address and the DCID. The ContextId is populated with the channel address and captures the generated DCID as a Touchpoint.

The INTERACTION_ID Context will be created or updated via UPSERT by the various actors (applications or users), such as IVR, throughout the customers' journey. Every interaction on this context will renew the lease of both the INTERACTION_ID and CONTACT_METHOD_ID ensuring that both exist in the grid together.

The ContextId of the INTERACTION_ID will be assigned the generated DCID, ensuring that it is unique for all time. Channel agnostic, all subsequent contact regarding the same query will use this associated INTERACTION_ID. As a result, the context will provide a detailed overview of the customer's journey.

3. Use Cases

Within the Dell Contact Center use cases, there are existing issues that have influenced the design of the pattern for context management:

1. Cases are not always created for the relevant queries in the contact center.
2. Missing Ids impact the customer experience.
3. Multiple DCNs per customer.
4. Cannot identify customer accurately.
5. Customers are regularly asked to provide previously specified information.
6. Mission Critical Contexts may get deleted. If missing, the EDM is queried.

The Use Cases described below are explored as part of two main phases of the implementation:

1. Migration Phase
2. Transformation Phase a. Migration Phase

Figure 25:
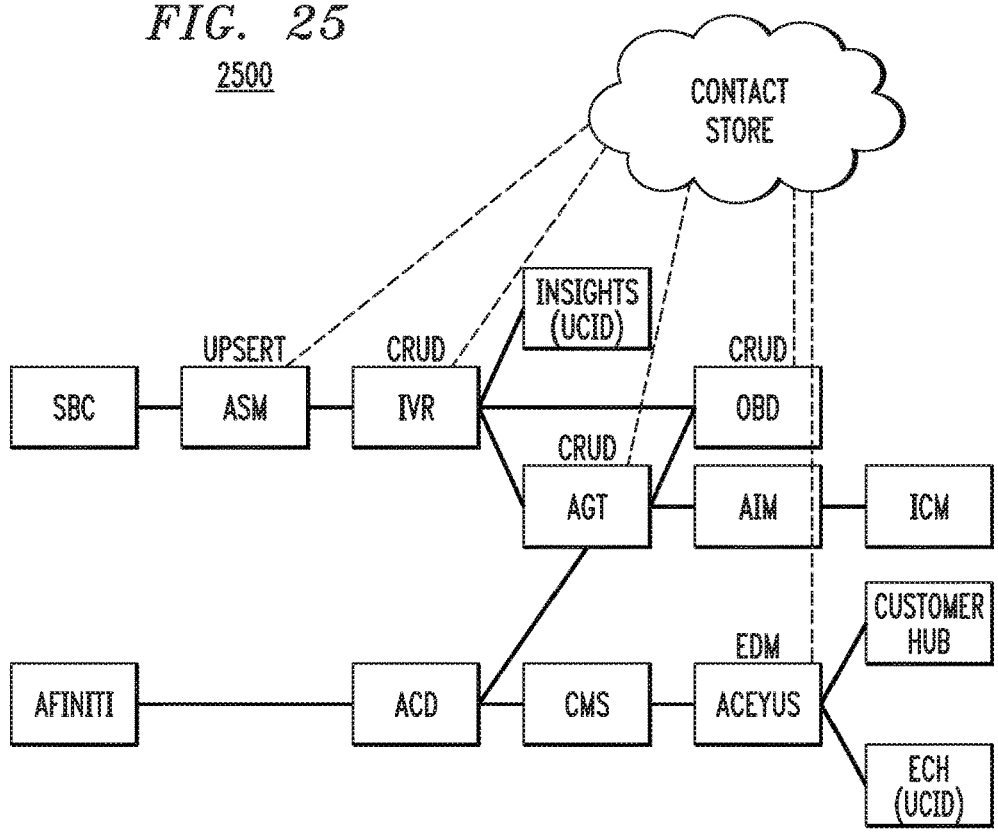

ICM replacement is the target for this phase. As part of this process, the remaining applications will utilize an in-memory data-grid, Context Store. FIG. 25 illustrates ICM removal 2500 as part of the migration phase.

(i) Core Integrations

The Dell Contact Center supports a multitude of core Users and Business Areas.

Users

Customer

The context management pattern supports scenarios where a single Contact Method (ANI etc.) manages multiple Customers. Each Customer has an associated DCN (or multiple DCNs) and this is added as a unique KVP in the CONTACT_METHOD_ID. Once a DCN is identified, INTERACTION_IDs with a matching DCN in the GroupId can be collected from the data-grid.

Enterprise

The pattern supports scenarios where a single contact channel (ANI, etc.) manages multiple members of an Enterprise. Each member has an associated DCN (or DCNs) and this is added as a unique KVP in the CONTACT_METHOD_ID. Once a DCN is identified, INTERACTION_IDs with a matching DCN in the GroupId can be collected from the data-grid. This pattern supports small, medium and large corporations.

Agent

The current Dell Agent ScreenPop has been identified as a potential bottleneck, taking as long as 30 seconds to load Sources of Record (SoR) to the desktop. Context data can be used to mitigate this by providing high-level data related to the query with low latency, while the other loads.

Support

The associated queries include Express Service Codes, Service Tags and Case Numbers.

The core KVPs identified currently are:
  Customer Experience Enhancers
    1. Diagnostic Link
    2. Chat Transcript Link
    3. Company Number
    4. Customer Authentication
  Customer Journey Markers
    5. Transfer Count
    6. Contact Date
    7. CONTACTMETHOD_ID
    8. Inherited interaction Id
      Express Service Code/Service Tag/Case Number.
    9. Query Type/Classifier
      Express Service Code/Service Tag/Case Number.

Figure 26:
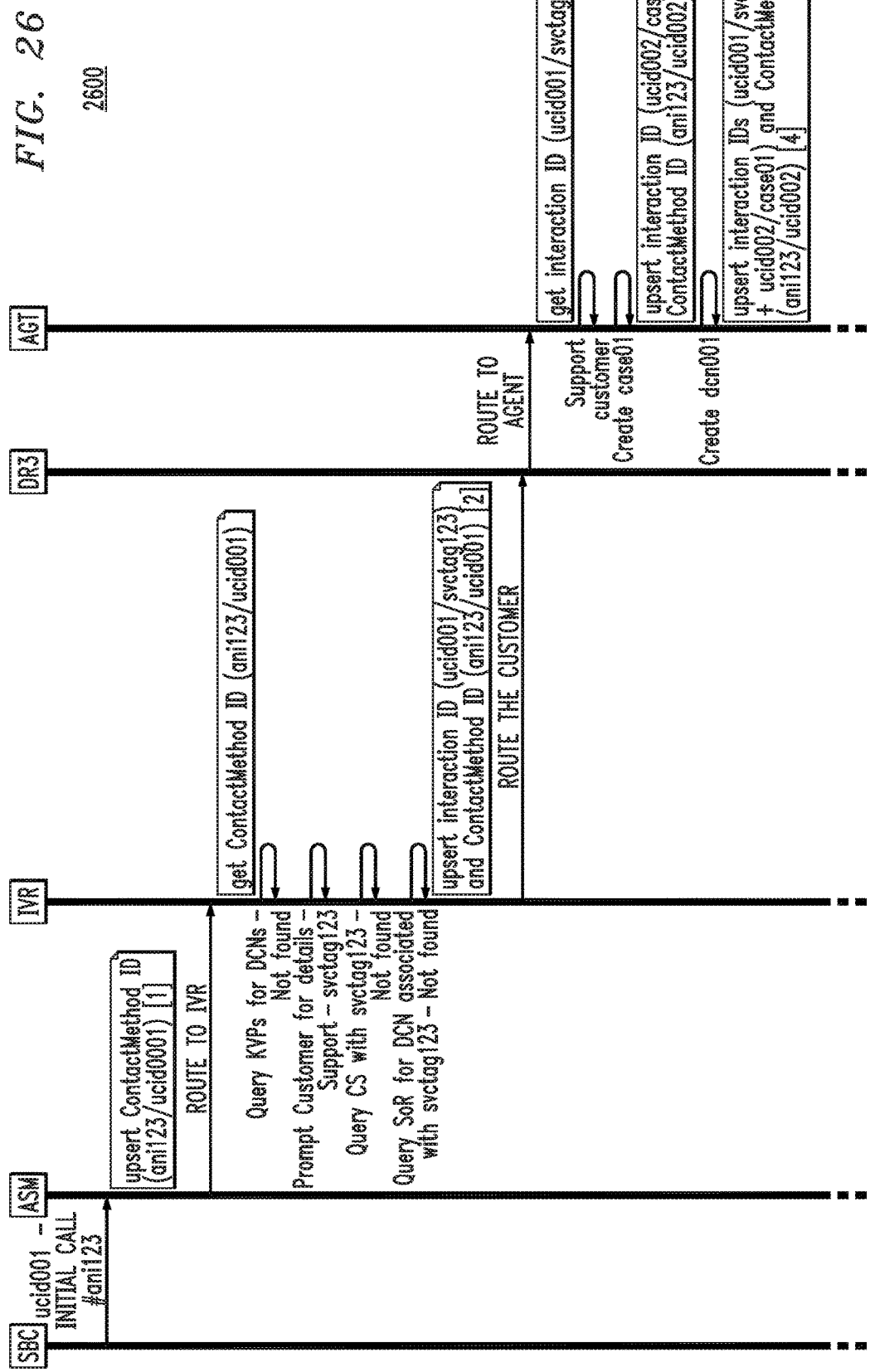
Figure 26:
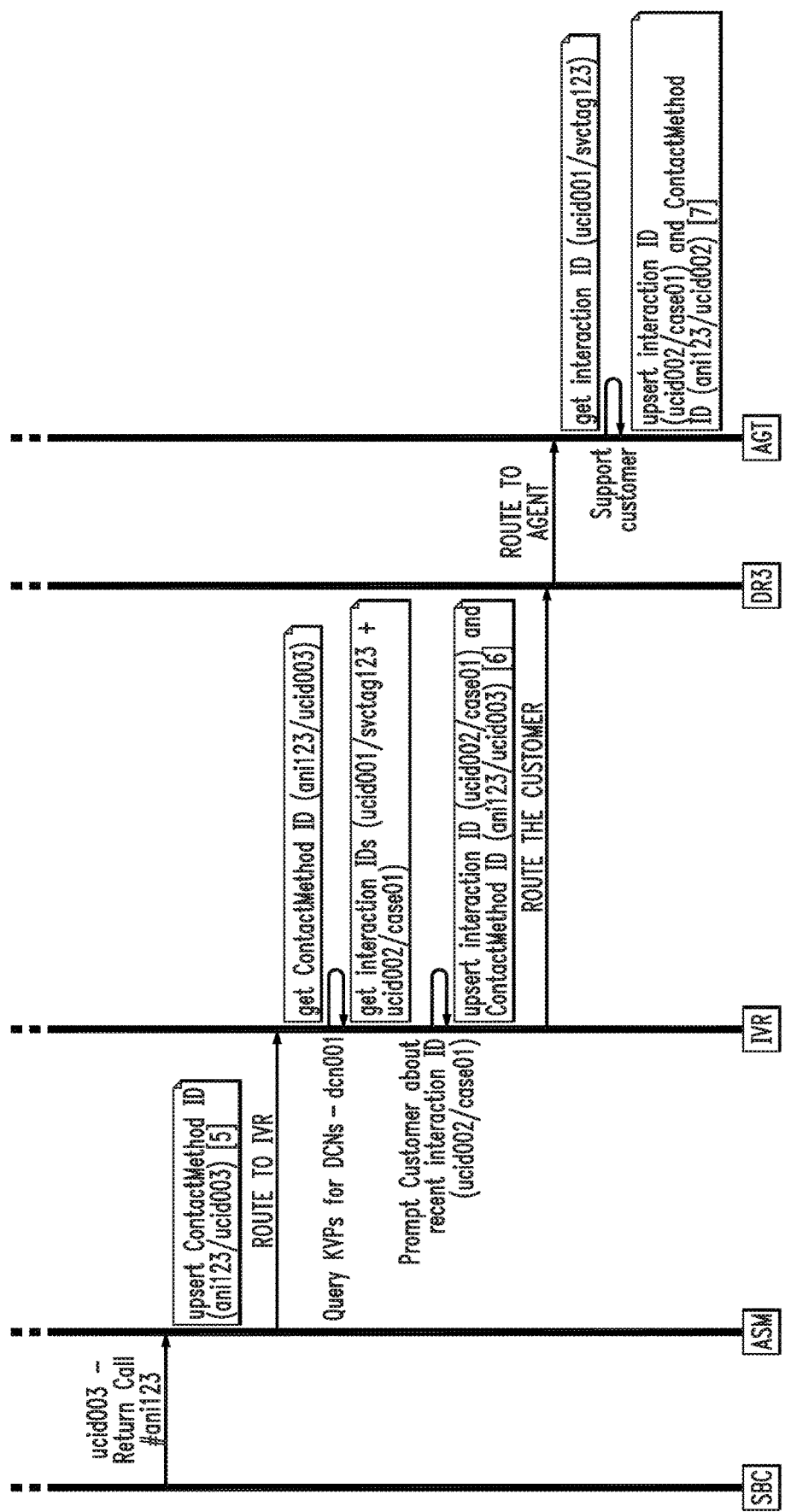

FIG. 26 illustrates a procedure 2600 for facilitating a return call with context data management patterns, as will be further explained below.

Use Case Context Management

1. ASM-Initial call-contact
   CONTACT_METHOD_ID: {"contextId":"ani123", "touchpoint":"DCID001"}
2. IVR-Initial call-query identified
   INTERACTION_ID: {
     "contextId":"DCID001", "aliasId":"svctag123", "touchpoint":"IVR" }
     data: {"queryType":"svctag", "ContactMethod":"ani123"}
   CONTACT_METHOD_ID: {"contextId":"ani123", "touchpoint":"DCID001"}
3. AGT-Initial call-query escalation (case)
   INTERACTION_ID: {
     "contextId":"DCID002", "aliasId":"case01", "touchpoint":"AGT" }
     data:"transferCount":"0","queryType":"case", "ContactMethod":ani123"}
   CONTACT_METHOD_ID: {"contextId":"ani123", "touchpoint: DCID002"}

4. AGT-Initial call-customer identified
   INTERACTION_ID: {"contextId":"DCID002", "aliasId":"case01","groupId":"dcn 001", "touchpoint":"AGT"}
      data:"transferCount":"0","queryType":"case","ContactMethod":"ani123" }
   INTERACTION_ID: {"contextId":"DCID001", "aliasId":"svgtag123,"groupId":"d cn001", "touchpoint":"AGT"}
      data: {"transferCount":"0","queryType":"svctag", "ContactMethod":"ani12 3"}
   CONTACT_METHOD_ID: {"contextId":"ani123", "touchpoint":"DCID001", "DCID002"}
      data: {"dcn001":"timestamp"}
5. ASM-return call-contact
   CONTACT_METHOD_ID: {"contextId":"ani123", "touchpoint":"DCID003"}
      data: {"dcn001":"timestamp"}
6. IVR-return call-query identified
   INTERACTION_ID: { "contextId":"DCID002", "aliasId":"case01", "groupId":"dcn001", touchpoint:IVR}
      data: {"transferCount":"0","queryType":"case", "ContactMethod":"ani123"}
   CONTACT_METHOD_ID: {"contextId":"ani123", "touchpoint":"DCID002"}
      data: {"dcn001":"timestamp"}
7. AGT-return call-discussion
   INTERACTION_ID: {"contextId":"DCID002", "aliasId":"case01","groupId":"den 001", "touchpoint":"AGT"}
      data: {"transferCount":"0","queryType":"case", "ContactMethod":"ani123"}
   CONTACT_METHOD_ID: {"contextId":"ani123", "touchpoint":"DCID002"}
      data: {"dcn001":"timestamp"}

Figure 27:
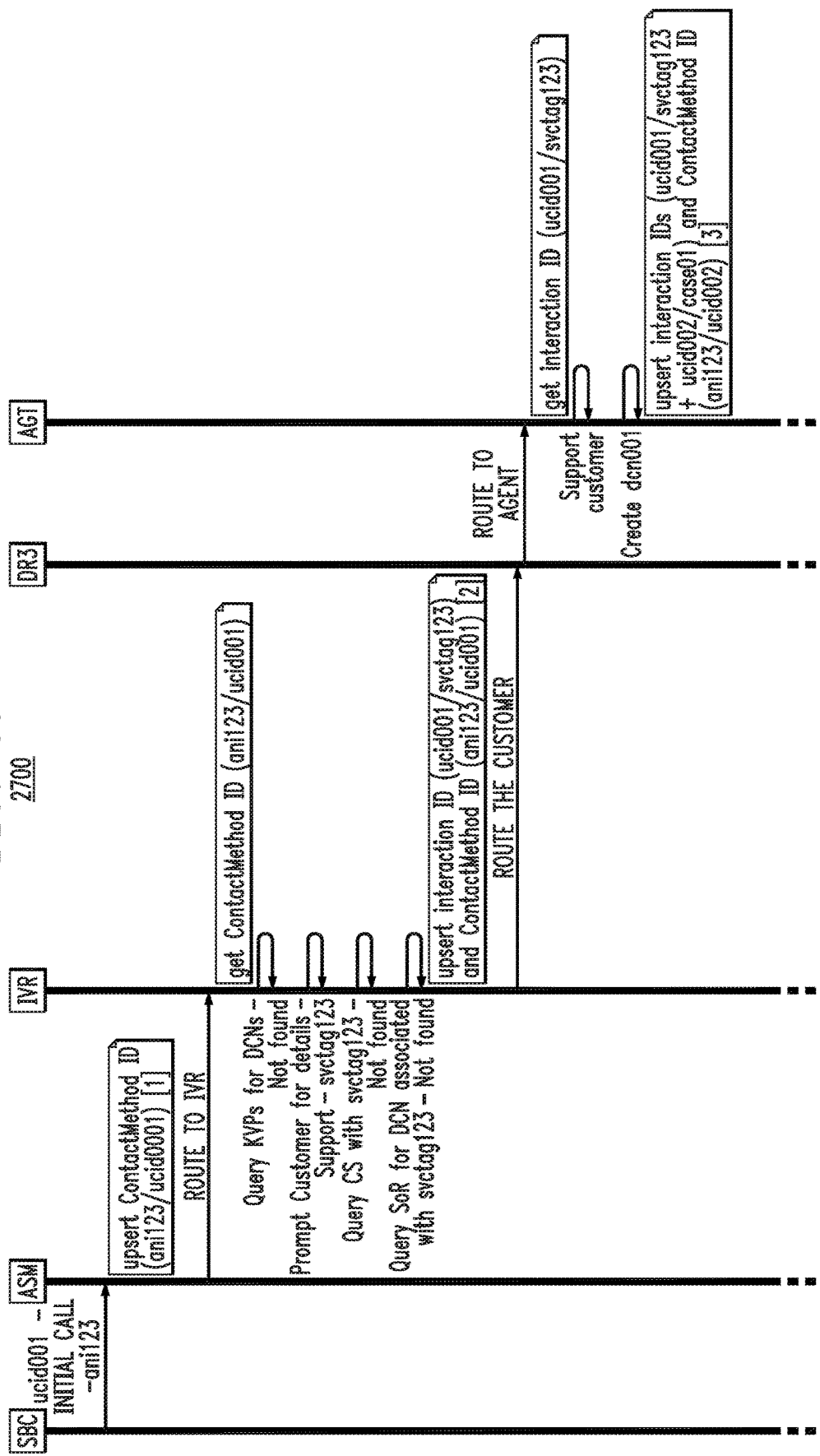

FIG. 27 illustrates a procedure 2700 for facilitating a call to chat with context data management patterns, as will be further explained below.

Use Case Context Management
1. ASM-Initial call-contact
   CONTACT_METHOD_ID: {c"ontextId:ani123, touchpoint:DCID001}
2. IVR-Initial call-query identified
   INTERACTION_ID: {contextId:DCID001, aliasId: svctag123, touchpoint:IVR}
      data: {"queryType":"svctag", "ContactMethod":"ani123"}
   CONTACT_METHOD_ID: {contextId:ani123, touchpoint:DCID001}
3. AGT-Initial call-customer identified
   INTERACTION_ID: {contextId:DCID002,aliasId: case01,groupId:dcn001, touchpoint:AGT}
      data: {"transferCount":"0","queryType":"case", "ContactMethod":"ani123"}
   INTERACTION_ID: {contextId:DCID001, aliasId: svctag123, groupId:dcn001, touchpoint:AGT}
      data: {"transferCount":"0","queryType":"svctag", "ContactMethod":"ani12 3"}
   CONTACT_METHOD_ID: {contextId:ani123, touchpoint:DCID001,DCID002}
      data: {d"cn001":"timestamp"}
4. ASM-follow-up chat-contact
   CONTACT_METHOD_ID: {contextId:cust1@dell, touchpoint:DCID003}
5. MOXI-follow-up chat-query identified
   INTERACTION_ID: {contextId:DCID001, aliasId: svctag123, groupId:dcn001, touchpoint:MOXI}
      data: {"queryType:svctag", "ContactMethod": "cust1@dell"}
   CONTACT_METHOD_ID: {contextId:cust1@dell, touchpoint:DCID001}
      data: {"dcn001":"timestamp"}
6. AGT-follow-up chat-discussion
   INTERACTION_ID: {contextId:DCID002, aliasId: case01, groupId:dcn001, touchpoint:AGT}
      data: {"transferCount":"0","queryType":"case", "ContactMethod":"cust1@dell"}
   CONTACT_METHOD_ID: {contextId:cust1@dell, touchpoint:DCID002}
      data: {"dcn001":"timestamp"}

Figure 28:
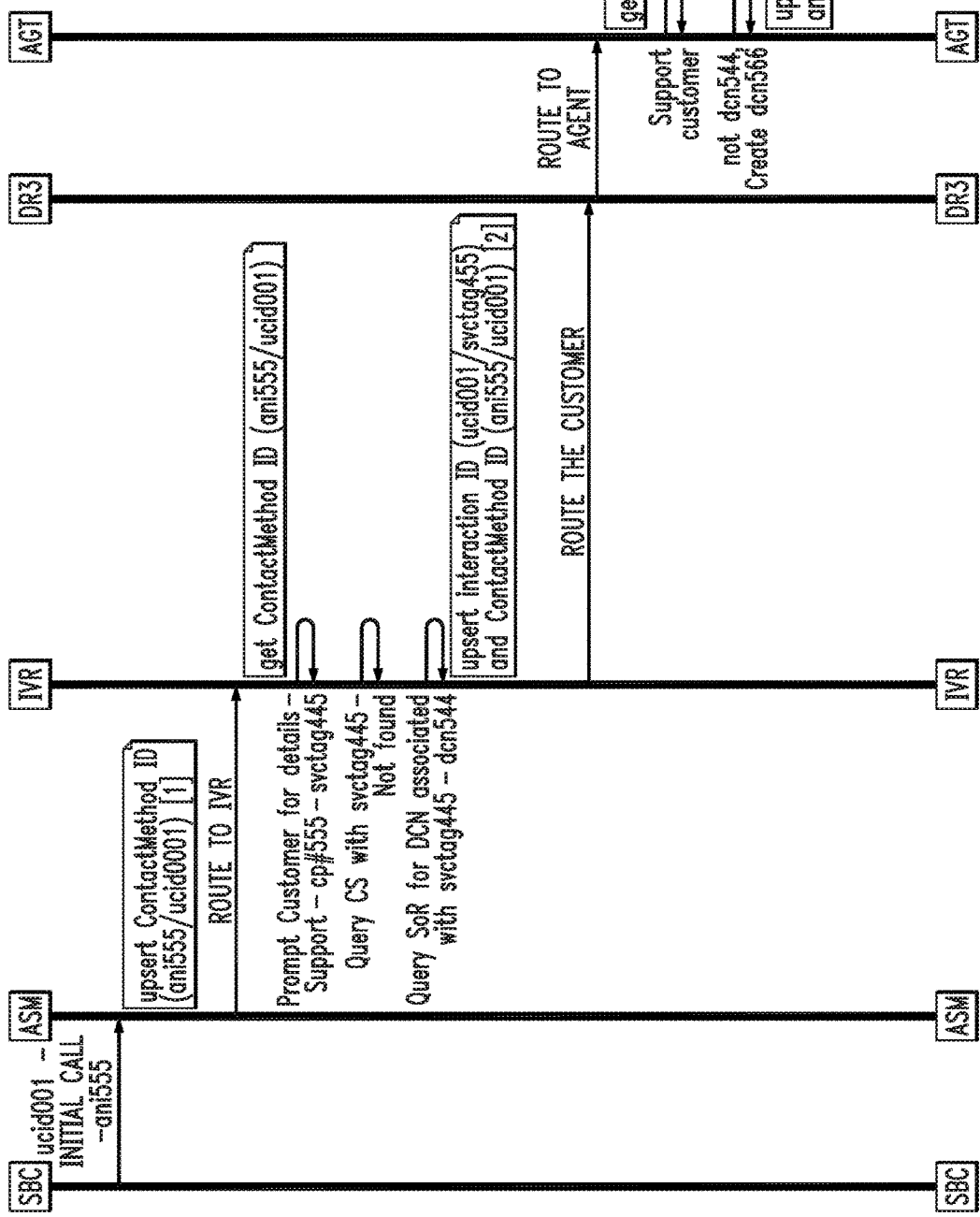

FIG. 28 illustrates a procedure 2800 for facilitating an enterprise call with context data management patterns, as will be further explained below.

Use Case Context Management
1. ASM-Enterprise call-contact
   CONTACT_METHOD_ID: {contextId:ani555, touchpoint:DCID001}
2. IVR Enterprise call-query identified
   INTERACTION_ID: {contextId:DCID001, groupId: dcn444, aliasId:svctag445, touchpoint:IVR}
      data: {"queryType":"svctag445","CompanyNumber":"cp555", "ContactMethod":"ani555"}
   CONTACT_METHOD_ID: {contextId:ani555, touchpoint:DCID001}
      data: {"dcn444":"timestamp"}
3. AGT-Enterprise call-customer identified
   INTERACTION_ID: {contextId:DCID001, aliasId: svctag123, groupId:dcn556, touchpoint:AGT}
      data: {"transferCount":"0","queryType": "svctag445","CompanyNumber": "cp555", "ContactMethod":"ani555"}
   CONTACT_METHOD_ID: {contextId: ani555, touchpoint:DCID001}
      data: {"dcn556":"timestamp"}

Sales

Throughout the Sales use cases, contacts are categorized as follows:
Suspect (received no quote)
Prospect (received a quote)
Customer The associated queries include: Cart numbers, Quote Numbers, DPIDs and orders.

Figure 29:
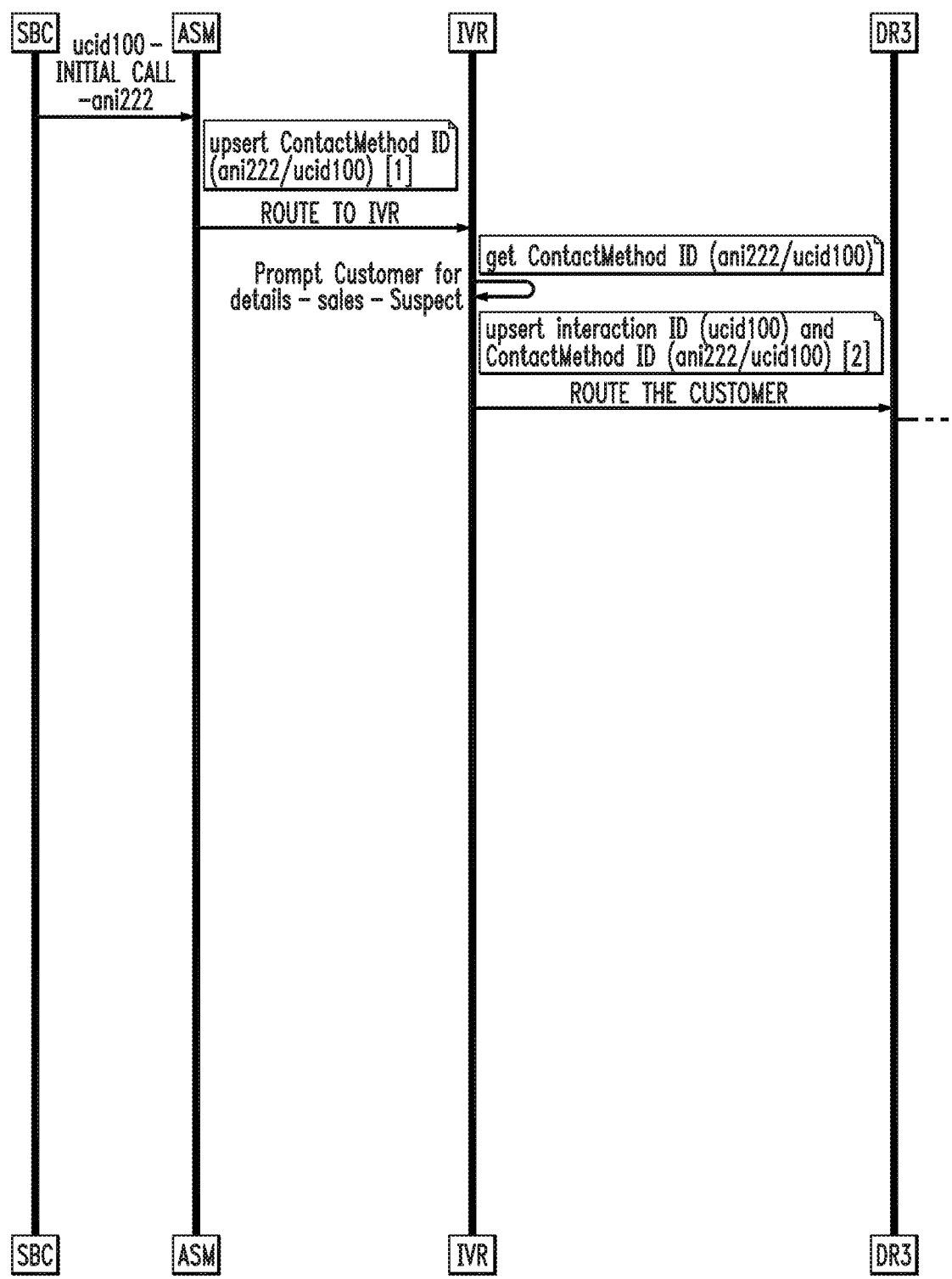
Figure 29:
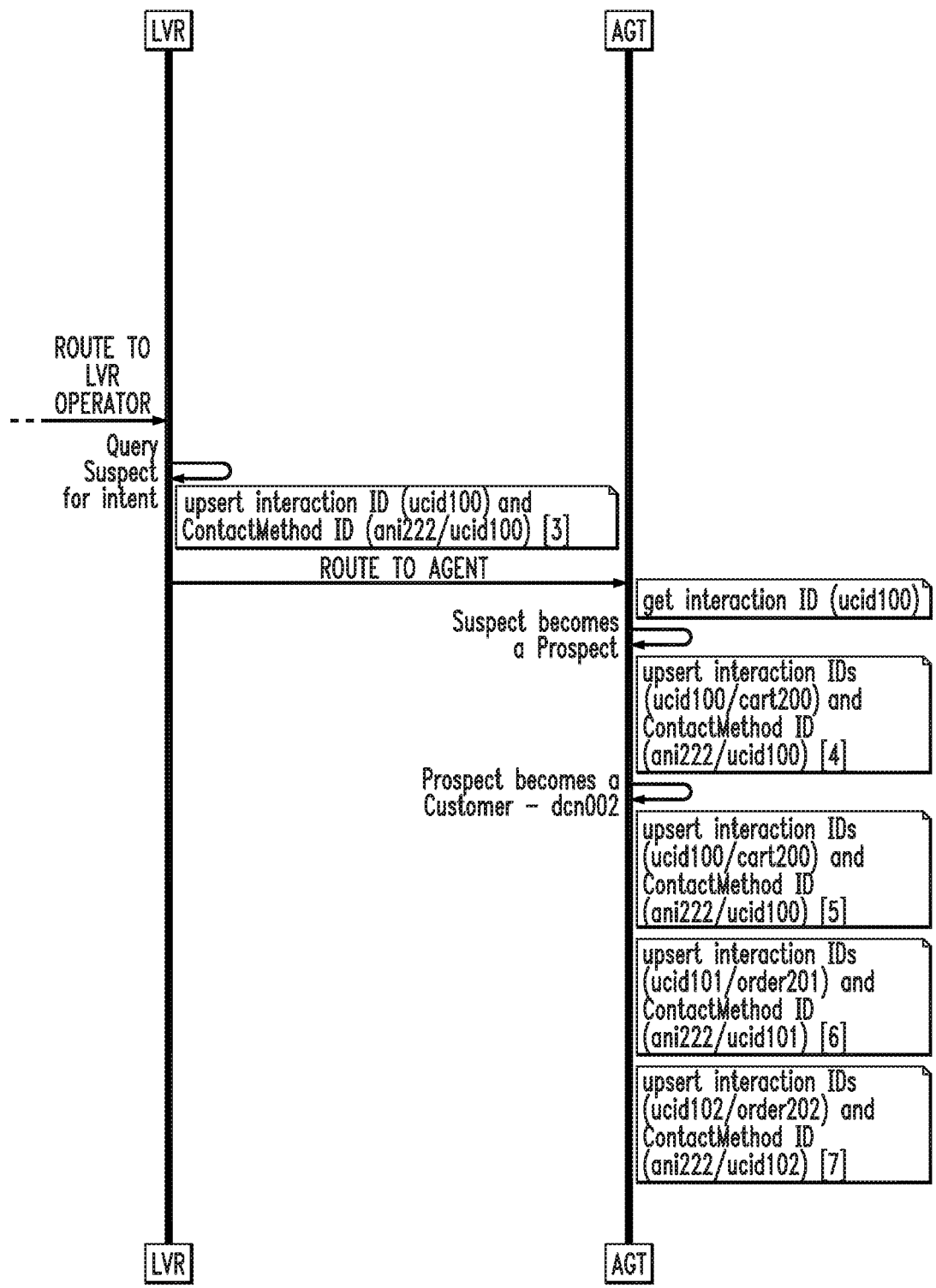

The core KVPs identified currently are:
Customer Experience Enhancers
1. Company Number
2. Customer Authentication
3. Sales Prospect Type
   Suspect
   Prospect
   Existing Customer
Customer Journey Markers
4. Transfer Count
5. Contact Date
6. CONTACTMETHOD_ID
7. Query Type/Classifier
   Cart Number/Quote Number/DPID/Order Number FIG. 29 illustrates a procedure 2900 for facilitating a sales call with context data management patterns, as will be further explained below.

Use Case Context Management
1. ASM-Sales call-contact
   CONTACT_METHOD_ID: {contextId:ani222, touchpoint:DCID100}
2. IVR-Sales call-query identified
   INTERACTION_ID: {contextId:DCID100, touchpoint:IVR}
      data:{"SalesProspectType":"Suspect", "ContactMethod":"ani222"}
   CONTACT_METHOD_ID: {contextId:ani222, touchpoint:DCID100}
3. LVR-Sales call-discussion
   INTERACTION_ID: {contextId:DCID100, touchpoint:LVR}
      data: {"transferCount":"0", "ContactMethod": "ani222"}
   CONTACT_METHOD_ID: {contextId: ani222, touchpoint:DCID100}
4. AGT-Sales call-query escalation (cart)
   INTERACTION_ID: {contextId:DCID100, aliasId:cart100, touchpoint:AGT}
      data: {"salesProspectType":"Prospect","transferCount":"1", "queryType":"cart", "ContactMethod": "ani222"}
   CONTACT_METHOD_ID: {contextId:ani222, touchpoint:DCID100}
5. AGT-Sales call-customer identified
   INTERACTION_ID: {contextId:DCID100, groupId:dcn002, aliasId:dpid100, touchpoint:AGT}
      data: {"salesProspectType":"Customer", "transferCount":"1", "queryType":"dpid", "ContactMethod":"ani222"}
   CONTACT_METHOD_ID: {contextId: ani222, touchpoint:DCID100}
   data: {"dcn002":"timestamp"}
6. AGT-Sales call-query escalation (order #1)
   INTERACTION_ID: {contextId:DCID101, groupId:dcn002, aliasId:order101, touchpoint:AGT}
      data: {"salesProspectType":"Customer", "transferCount":"0", "queryType":"order", "ContactMethod":"ani222"}
   CONTACT_METHOD_ID: {contextId: ani222, touchpoint:DCID101}
      data: {"dcn002":"timestamp"}
7. AGT-Sales call-query escalation (order #2)
   INTERACTION_ID: {contextId:DCID102, groupId:dcn002, aliasId:order102, touchpoint:AGT}
      data: {"transferCount":"0","queryType":"order", "ContactMethod": "ani222"}
   CONTACT_METHOD_ID: {contextId: ani222, touchpoint:DCID102}
      data: {"dcn002":"timestamp"}

Care
   The associated queries include: Case numbers, Cart numbers, Quote Numbers, DPIDs and order Numbers.
   The core KVPs identified currently are:
      Customer Experience Enhancers
         1. Campaign Id
         2. Diagnostic Link
         3. Chat Transcript Link
         4. Company Number
         5. Customer Authentication
         6. Sales Prospect Type
            Suspect
            Prospect
            Existing Customer
      Customer Journey Markers
         7. SMS Direction
            In
            Out
         8. Transfer Count
         9. Contact Date
         10. CONTACTMETHOD_ID
         11. Query Type
            Care
         12. Interaction Type
            Case number/Cart number/Quote Number/DPID/order number DFS
   The associated queries are DFS account numbers.
   The Core KVPs identified are:
      Customer Experience Enhancers
         1. Chat Transcript Link
         2. Company Number
         3. Customer Authentication
      Customer Journey Markers
         4. SMS Direction
            In
            Out
         5. Transfer Count
         6. Contact Date
         7. CONTACTMETHOD_ID
         8. Query Type
            DFS
         9. Interaction Type
            Account number
      Non-Delinquent Accounts
         10. DFS account number
            13 digit or 15 digits for Lease Account Number
            19 digits for Revolving Credit Account Number
         11. Account Type
            Cust # or DPA #
         12. Transfer Type
            CT, FT, HT
         13. IVR Last State
            Additional Options
      Delinquent Accounts
         10. DFS account number
            13 digits or 15 digits for Lease Account Number
            19 digits for Revolving Credit Account Number
         11. Account Type
            Cust # or DPA #
         12. Transfer Type
            CT, FT, HT
         13. IVR Last State
            Additional Options
         14. Collections agency assignment
            3 digit code (example: ARA)

When customers call into DFS, the dispatch application does some initial parsing based upon DNIS driving the initial menus. If a caller selects the CFE menu option for billing questions the application initiates the authentication process by which we attempt to validate the customer against DFS records. If the caller does not engage with the authentication process one of two processes happened. In the consumer space, the system has implemented un-engaged caller, by which after three attempts to authenticate if the customer doesn't at least acknowledge they are on the line the application does a disconnect. In the SMB space, after three attempts, the system defaults based upon DNIS.

When the system does the data-dip to the DFS systems of record depending on the financial product, the system gets back in near real time up to 300 data elements, including the status of the account. This includes all financial information, demographics information and delinquencies.

Advanced Integrations

SDR is a system of record used by Sales.

Delta is a system of record used by support.

b. Transformation Phase

Some assumptions for this phase include:

DCID is channel specific, facilitating the various media types.

New applications/actors introduced to the solution are identified within the touchpoint of the interaction id.

KVPs is stored with the context store as API_IDs to support the revision of valid entries to the data-grid.

Framework that can build standards with minimum overhead.

The customer's journey is well defined within the data-grid. It results in the customer being easily associated with their various channel types via the CONTACT_METHOD_ID. Further, each of the customer's queries capture the various actors and steps involved in reaching a resolution.

c. Failure Scenarios

Figure 30:
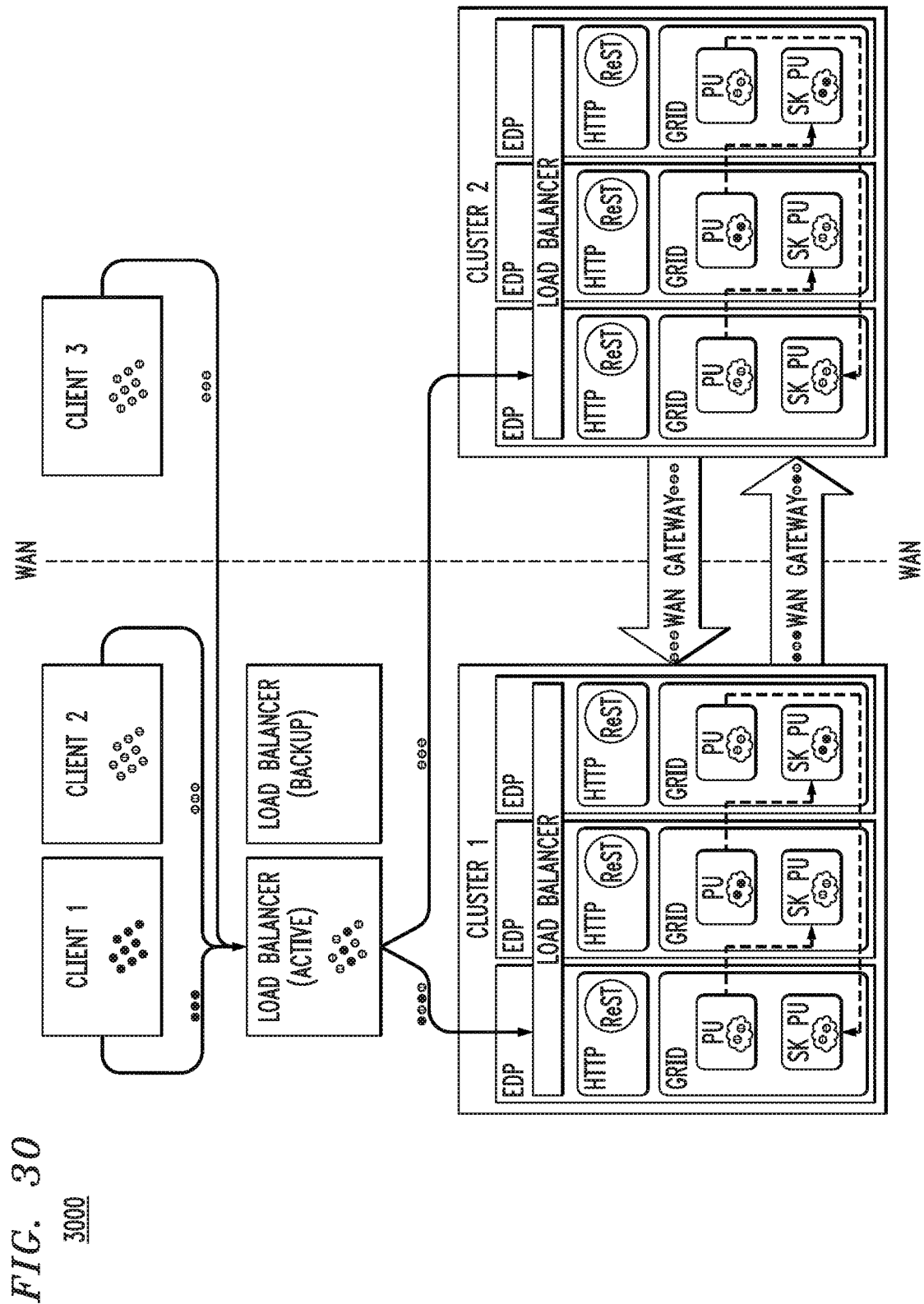

In a geo-redundant setup, e.g., the geo-distributed clusters architecture 3000 in FIG. 30, the load balancer detects that a cluster is unavailable, and the load balancer routes the incoming requests to the available cluster. The geo-redundant architecture 3000 supports the following failover scenarios:

Both servers are unavailable: If the two Avaya Breeze™ servers in a Context Store cluster are unavailable, the cluster IP address is also unavailable. The geo-redundant load balancer detects the failure and routes all requests to the remaining active cluster Either of the Avaya Breeze™ servers and the other server of a Context Store cluster is unavailable, the remaining server detects the failure and returns a status code of 500. Upon receiving the failure information from the remaining server, the load balancer routes all requests to the other cluster in the geo-redundant system.

All three servers are unavailable: If all three Avaya Breeze™ servers in a cluster are unavailable, the geo redundant load balancer routes all requests to the remaining cluster in the geo-redundant system.

For the reference implementation, the nginx running on the geo-cluster automatically detects if the cluster is back in service. There are no manual steps required for the Load Balancer to reintroduce a cluster back into receiving requests.

A sample context record 3100 is illustrated in FIG. 31.

A partial acronym listing for the example implementations depicted above in FIGS. 6-31 is as follows:

| Acronym | Definition |
| --- | --- |
| ANI | Automatic number identification |
| API | Application Program Interface |
| ASM | Avaya Session Manager |
| CRM | Customer Relationship Management |
| DCID | Dell Contact Identifier |
| DCN | Dell customer Number |
| DFS | Dell Financial Services |
| DPID | Dell Product Identifier |
| DR3 | Dynamic Routing 3.2 |
| ECID | Enterprise Customer Identifier also known as the Party ID and Keyring ID |
| EDM | External Data Mart |
| HTML | hypertext markup language |
| ICM | Intelligent Contact Management |

-continued

| Acronym | Definition |
| --- | --- |
| IVR | Interactive voice response |
| JSON | JavaScript Object Notation |
| KVP | Key Value Pair |
| OBD | Outbound |
| PII | Personal Identification Information |
| SMS | Short Message Service |
| SOR | Sources of record |
| DCID | Dell Contact Identifier |
| URL | Uniform Resource Locator |
| UUID | Unique Universal Identifier |
| XML | eXtensible Markup Language |

Illustrative embodiments of processing platforms utilized to implement information processing systems with contextual data management functionality will now be described in greater detail with reference to FIGS. 32 and 33. For example, one or more of the processing platforms in FIGS. 32 and 33, as well as alternative processing platforms, can be used to implement all or portions of information processing systems and methodologies represented in FIGS. 1-31.

Figure 32:
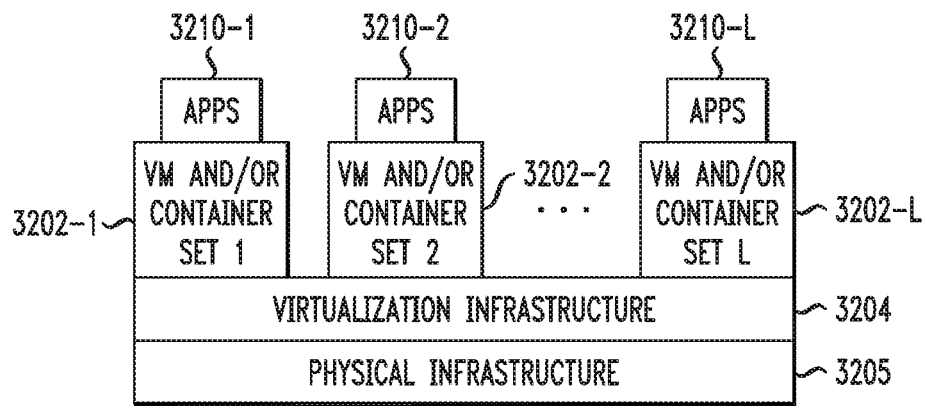
FIGS. 32 and 33 show examples of processing platforms that may be utilized to implement at least a portion of a customer contact center environment with an information processing system having context data management functionalities, according to an illustrative embodiment.
Figure 33:
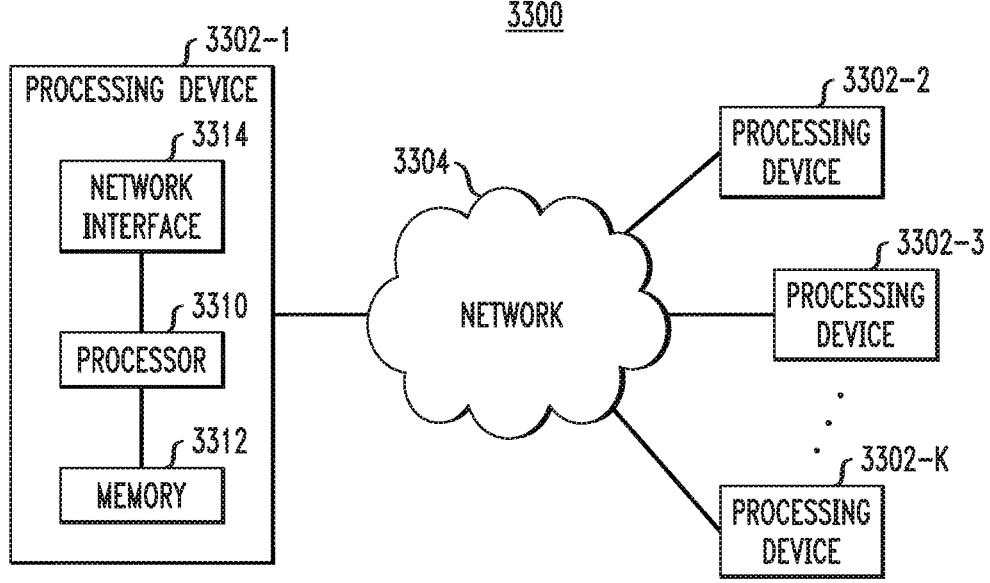

FIG. 32 shows an example processing platform comprising cloud infrastructure 3200. The cloud infrastructure 3200 comprises a combination of physical and virtual processing resources that may be utilized to implement at least a portion of the information processing system 100. The cloud infrastructure 3200 comprises multiple virtual machines (VMs) and/or container sets 3202-1, 3202-2, . . . 3202-L implemented using virtualization infrastructure 3204. The virtualization infrastructure 3204 runs on physical infrastructure 3205, and illustratively comprises one or more hypervisors and/or operating system level virtualization infrastructure. The operating system level virtualization infrastructure illustratively comprises kernel control groups of a Linux operating system or other type of operating system.

The cloud infrastructure 3200 further comprises sets of applications 3210-1, 3210-2, . . . 3210-L running on respective ones of the VMs/container sets 3202-1, 3202-2, . . . 3202-L under the control of the virtualization infrastructure 3204. The VMs/container sets 3202 may comprise respective VMs, respective sets of one or more containers, or respective sets of one or more containers running in VMs.

In some implementations of the FIG. 32 embodiment, the VMs/container sets 3202 comprise respective VMs implemented using virtualization infrastructure 3204 that comprises at least one hypervisor. Such implementations can provide contextual data management functionality of the type described above for one or more processes running on a given one of the VMs. For example, each of the VMs can implement contextual data management functionality for one or more processes running on that particular VM.

The underlying physical machines may comprise one or more distributed processing platforms that include one or more storage systems.

In other implementations of the FIG. 32 embodiment, the VMs/container sets 3202 comprise respective containers implemented using virtualization infrastructure 3204 that provides operating system level virtualization functionality, such as support for Docker containers running on bare metal hosts, or Docker containers running on VMs. The containers are illustratively implemented using respective kernel control groups of the operating system. Such implementations can provide contextual data management functionality of the type described above for one or more processes running on different ones of the containers. For example, a container host device supporting multiple containers of one or more container sets can implement one or more instances of contextual data management logic for use in implementing the functionalities described herein.

As is apparent from the above, one or more of the processing modules or other components of system environment 100 may each run on a computer, server, storage device or other processing platform element. A given such element may be viewed as an example of what is more generally referred to herein as a "processing device." The cloud infrastructure 3200 shown in FIG. 32 may represent at least a portion of one processing platform. Another example of such a processing platform is processing platform 3300 shown in FIG. 33.

The processing platform 3300 in this embodiment comprises a portion of system 100 and includes a plurality of processing devices, denoted 3302-1, 3302-2, 3302-3, . . . 3302-K, which communicate with one another over a network 3304.

The network 3304 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 3302-1 in the processing platform 3300 comprises a processor 3310 coupled to a memory 3312.

The processor 3310 may comprise a microprocessor, a microcontroller, an application-specific integrated circuit (ASIC), a field-programmable gate array (FPGA) or other type of processing circuitry, as well as portions or combinations of such circuitry elements.

The memory 3312 may comprise random access memory (RAM), read-only memory (ROM), flash memory or other types of memory, in any combination. The memory 3312 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 3302-1 is network interface circuitry 3314, which is used to interface the processing device with the network 3304 and other system components, and may comprise conventional transceivers.

The other processing devices 3302 of the processing platform 3300 are assumed to be configured in a manner similar to that shown for processing device 3302-1 in the figure.

Again, the particular processing platform 3300 shown in the figure is presented by way of example only, and systems and methodologies in FIGS. 1-31 may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the contextual data management functionality of one or more components of a host device or storage system as disclosed herein are illustratively implemented in the form of software running on one or more processing devices.

It is be appreciated that the particular arrangements shown and described in conjunction with FIGS. 1-33 are presented by way of illustrative example only, and numerous alternative embodiments are possible. The various embodiments disclosed herein should therefore not be construed as limiting in any way. Numerous alternative arrangements for implementing contextual data management can be utilized in other embodiments. For example, those skilled in the art will recognize that alternative processing operations and associated system entity configurations can be used in other embodiments. It is therefore possible that other embodiments may include additional or alternative system entities, relative to the entities of the illustrative embodiments. Also, the particular system and device configurations and associated contextual data management methodologies can be varied in other embodiments.

It is also to be appreciated that the particular advantages described above and elsewhere herein are associated with particular illustrative embodiments and need not be present in other embodiments. Also, the particular types of information processing system features and functionality as illustrated in the drawings and described above and herein are exemplary only, and numerous other arrangements may be used in other embodiments.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, contextual data management processes and associated control logic. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   receiving a given contact instance for a given user of a contact center, wherein the contact center comprises a plurality of communication channels configured to enable the user to initiate a contact instance and wherein the given contact instance is received over one of the plurality of communication channels; and
   one of generating and updating a context data management pattern in response to receiving the given contact instance, wherein the context data management pattern comprises a data structure of one or more records that maintain information relating to the given contact instance received over the plurality of communication channels and information relating to one or more previous contact instances associated with the user received over one or more of the plurality of communication channels;

wherein the one of generating and updating step further comprises one of generating and updating a contact method record and an interaction record as the one or more records of the context data management pattern;

wherein the one of generating and updating step further comprises one of generating and updating a touchpoint record as one of the one or more records of the context data management pattern, the touchpoint record comprises information pertaining to one or more entities that have accessed or are accessing the contact method record and the interaction record;

wherein the touchpoint record comprises at least one access entity identifier that identifies the entity accessing the contact method record and the interaction record, and an access lease time that specifies an access time period corresponding to a given period of time in which the one or more entities has access to the contact method record and the interaction record;

wherein the one of generating and updating step further comprises one of automatically generating and updating at least one contact identifier as part of the contact method record, the at least one contact identifier identifying the given user;

wherein the plurality of communication channels includes a channel platform of a first type and a channel platform of a second type different from the first type;

wherein the contact method record comprises the at least one contact identifier and one or more channel identifiers, the one or more channel identifiers identifying at least one channel platform type of one of the plurality of communication channels associated with the given contact instance;

wherein the access lease time of the touchpoint record is automatically renewed for at least some of the one or more entities in association with access thereof to the contact method record and the interaction record; and wherein the receiving, generating and updating steps are performed via one or more processing devices.

2. The method of claim 1, further comprising enabling access to at least a portion of the one or more records of the context data management pattern by at least one of an agent and an automated system to provide the at least one of an agent and an automated system with a representation of the given contact instance or the one or more previous contact instances.

3. The method of claim 1, wherein the contact method record comprises the at least one contact identifier that identifies one or more contact instances associated with the user, and the one or more channel identifiers that respectively identify one or more communication channels of the plurality of communication channels associated with the given contact instance or the one or more previous contact instances.

4. The method of claim 1, wherein the interaction record comprises information pertaining to an intent of the user for initiating the given contact instance.

5. The method of claim 4, wherein the interaction record comprises at least one interaction identifier that identifies the interaction, an interaction type that specifies a type of interaction based on the user intent, and interaction-related data.

6. The method of claim 1, wherein the one of generating and updating step further comprises one of generating and updating a user group record as one of the one or more records of the context data management pattern.

7. The method of claim 6, wherein the user group record comprises information pertaining to a grouping of the given user with one or more other users based on at least one common attribute.

8. The method of claim 7, wherein the at least one common attribute comprises a channel identifier of a common communication channel through which the given user and the one or more other users accessed the contact center.

9. The method of claim 7, wherein the user group record comprises a user group identifier.

10. The method of claim 1, wherein the access lease time of the touchpoint record is infinite for a select one of the one or more entities.

11. The method of claim 1, wherein the contact method record comprises a universal contact identifier associated with a plurality of contact instances, wherein each contact instance is identified by the universal contact identifier, and a channel identifier of the one or more channel identifiers associated with a respective contact instance.

12. An apparatus, comprising:
at least one processor operatively coupled to a memory and configured to:
receive a given contact instance for a given user of a contact center, wherein the contact center comprises a plurality of communication channels configured to enable the user to initiate a contact instance and wherein the given contact instance is received over one of the plurality of communication channels; and one of generate and update a context data management pattern in response to receiving the given contact instance, wherein the context data management pattern comprises a data structure of one or more records that maintain information relating to the given contact instance received over the plurality of communication channels and information relating to one or more previous contact instances associated with the user received over one or more of the plurality of communication channels;

wherein the one of generating and updating step further comprises one of generating and updating a contact method record and an interaction record as the one or more records of the context data management pattern;

wherein the one of generating and updating step further comprises one of generating and updating a touchpoint record as one of the one or more records of the context data management pattern, the touchpoint record comprises information pertaining to one or more entities that have accessed or are accessing the contact method record and the interaction record;

wherein the touchpoint record comprises at least one access entity identifier that identifies the entity accessing the contact method record and the interaction record, and an access lease time that specifies an access time period corresponding to a given period of time in which the one or more entities has access to the contact method record and the interaction record;

wherein the one of generating and updating step further comprises one of automatically generating and updating at least one contact identifier as part of the contact method record, the at least one contact identifier identifying the given user;

wherein the plurality of communication channels includes a channel platform of a first type and a channel platform of a second type different from the first type;

wherein the contact method record comprises the at least one contact identifier and one or more channel identifiers, the one or more channel identifiers identifying at least one channel platform type of one of the plurality of communication channels associated with the given contact instance; and wherein the access lease time of the touchpoint record is automatically renewed for at least some of the one or more entities in association with access thereof to the contact method record and the interaction record.

13. The apparatus of claim 12, wherein the at least one processor and memory is further configured to enable access to at least a portion of the one or more records of the context data management pattern by at least one of an agent and an automated system to provide the at least one of an agent and an automated system with a representation of the given contact instance or the one or more previous contact instances.

14. The apparatus of claim 12, wherein the one of generating and updating operation further comprises one of generating and updating an interaction record as one of the one or more records of the context data management pattern.

15. The apparatus of claim 12, wherein the one of generating and updating step further comprises one of generating and updating a user group record as one of the one or more records of the context data management pattern; and wherein the user group record comprises information pertaining to a grouping of the given user with one or more other users based on at least one common attribute.

16. The apparatus of claim 12, wherein the contact method record comprises a universal contact identifier associated with a plurality of contact instances, wherein each contact instance is identified by the universal contact identifier, and a channel identifier of the one or more channel identifiers associated with a respective contact instance.

17. The apparatus of claim 12, wherein the access lease time of the touchpoint record is infinite for a select one of the one or more entities.

18. An article of manufacture comprising a processor-readable storage medium having encoded therein executable code of one or more software programs, wherein the one or more software programs when executed by one or more processing devices implement steps of:

receiving a given contact instance for a given user of a contact center, wherein the contact center comprises a plurality of communication channels configured to enable the user to initiate a contact instance and wherein the given contact instance is received over one of the plurality of communication channels; and one of generating and updating a context data management pattern in response to receiving the given contact instance, wherein the context data management pattern comprises a data structure of one or more records that maintain information relating to the given contact instance received over the plurality of communication channels and information relating to one or more previous contact instances associated with the user received over one or more of the plurality of communication channels;

wherein the one of generating and updating step further comprises one of generating and updating a contact method record and an interaction record as the one or more records of the context data management pattern;

wherein the one of generating and updating step further comprises one of generating and updating a touchpoint record as one of the one or more records of the context data management pattern, the touchpoint record comprises information pertaining to one or more entities that have accessed or are accessing the contact method record and the interaction record;

wherein the touchpoint record comprises at least one access entity identifier that identifies the entity accessing the contact method record and the interaction record, and an access lease time that specifies an access time period corresponding to a given period of time in which the one or more entities has access to the contact method record and the interaction record;

wherein the one of generating and updating step further comprises one of automatically generating and updating at least one contact identifier as part of the contact method record, the at least one contact identifier identifying the given user;

wherein the plurality of communication channels includes a channel platform of a first type and a channel platform of a second type different from the first type;

wherein the contact method record comprises the at least one contact identifier and one or more channel identifiers, the one or more channel identifiers identifying at least one channel platform type of one of the plurality of communication channels associated with the given contact instance; and wherein the access lease time of the touchpoint record is automatically renewed for at least some of the one or more entities in association with access thereof to the contact method record and the interaction record.

19. The article of claim 18, further comprising enabling access to at least a portion of the one or more records of the context data management pattern by at least one of an agent and an automated system to provide the at least one of an agent and an automated system with a representation of the given contact instance or the one or more previous contact instances.

20. The article of claim 18, wherein the access lease time of the touchpoint record is infinite for a select one of the one or more entities.

* * * * *